(12) United States Patent
Cesa et al.

(10) Patent No.: US 11,264,849 B2
(45) Date of Patent: Mar. 1, 2022

(54) ROTOR FOR AN ELECTRIC MACHINE

(71) Applicant: Jaguar Land Rover Limited, Coventry (GB)

(72) Inventors: Tiago Cesa, Coventry (GB); Alexandros Michaelides, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 0 days.

(21) Appl. No.: 16/330,260

(22) PCT Filed: Nov. 22, 2017

(86) PCT No.: PCT/EP2017/080039
§ 371 (c)(1),
(2) Date: Mar. 4, 2019

(87) PCT Pub. No.: WO2018/095969
PCT Pub. Date: May 31, 2018

(65) Prior Publication Data
US 2019/0199150 A1 Jun. 27, 2019

(30) Foreign Application Priority Data
Nov. 24, 2016 (GB) .................................. 1619856.6

(51) Int. Cl.
*H02K 1/27* (2006.01)
*H02K 1/276* (2022.01)
(Continued)

(52) U.S. Cl.
CPC .......... *H02K 1/2766* (2013.01); *H02K 21/14* (2013.01); *B60K 1/00* (2013.01)

(58) Field of Classification Search
CPC .... H02K 1/2766; H02K 1/276; H02K 1/2753; H02K 21/14; H02K 21/16; B60K 1/00
(Continued)

(56) References Cited

U.S. PATENT DOCUMENTS 6,472,789 B1 10/2002 Akemakou
2004/0017123 A1 1/2004 Miyashita et al.
(Continued)

FOREIGN PATENT DOCUMENTS

EP 2012410 A1 1/2009
EP 2600496 A1 6/2013
(Continued)

OTHER PUBLICATIONS

Patents Act 1977: Combined Search and Examination Report under Sections 17 and 18(3), UKIPO Application No. GB1619856.6, dated May 25, 2017, 5 pp.
(Continued)

*Primary Examiner* — Michael Andrews
(74) *Attorney, Agent, or Firm* — McCoy Russell LLP

(57) ABSTRACT

The present disclosure relates to a rotor (3) for an electric machine (1). The rotor (3) includes a plurality of magnet poles (5*a-f*; 5*a-h*) each comprising one or more permanent magnets (6-*n*). The magnet poles (5*a-f*; 5*a-h*) are angularly separated from each other and an inter-pole region (7*a-f*; 7*a-h*) is formed between adjacent magnet poles (5*a-f*; 5*a-h*). At least one external flux barrier (12-1, 12-2) is disposed in each said inter-pole region (7*a-f*; 7*a-h*), the at least one external flux barrier (12-1, 12-2) comprising an external aperture. The present disclosure also relates to an electric machine (1) including a rotor (3); and to a vehicle (2) including an electric machine (1).

18 Claims, 16 Drawing Sheets

(51) Int. Cl.
*H02K 21/14* (2006.01)
*B60K 1/00* (2006.01)

(58) Field of Classification Search
USPC .................. 310/156.56, 156.57, 156.53
See application file for complete search history.

(56) References Cited

U.S. PATENT DOCUMENTS

| | | | |
|---|---|---|---|
| 2012/0133239 A1* | 5/2012 | Taema | H02K 21/16 310/216.094 |
| 2012/0267977 A1* | 10/2012 | Merwerth | H02K 1/2766 310/156.53 |
| 2012/0274168 A1* | 11/2012 | Holzner | H02K 1/246 310/156.53 |
| 2014/0217849 A1 | 8/2014 | Soma et al. | |

FOREIGN PATENT DOCUMENTS

| | | | | |
|---|---|---|---|---|
| JP | 2000245087 A | 9/2000 | | |
| JP | 2013132124 A | 7/2013 | | |
| JP | 201654608 A | 4/2016 | | |
| WO | 0024110 A1 | 4/2000 | | |
| WO | 2007048211 | 3/2007 | | |
| WO | WO-2007048211 A2 * | 5/2007 | ........... | H02K 1/2766 |
| WO | 2016039746 A1 | 3/2016 | | |

OTHER PUBLICATIONS

Patents Act 1977: Combined Search and Examination Report under Sections 17 and 18(3), UKIPO Application No. GB1719371.5, dated May 21, 2018, 9 pp.

International Search Report and Written Opinion of the International Searching Authority, International Application No. PCT/EP2017/080039, dated Apr. 11, 2018, 20 pp.

* cited by examiner

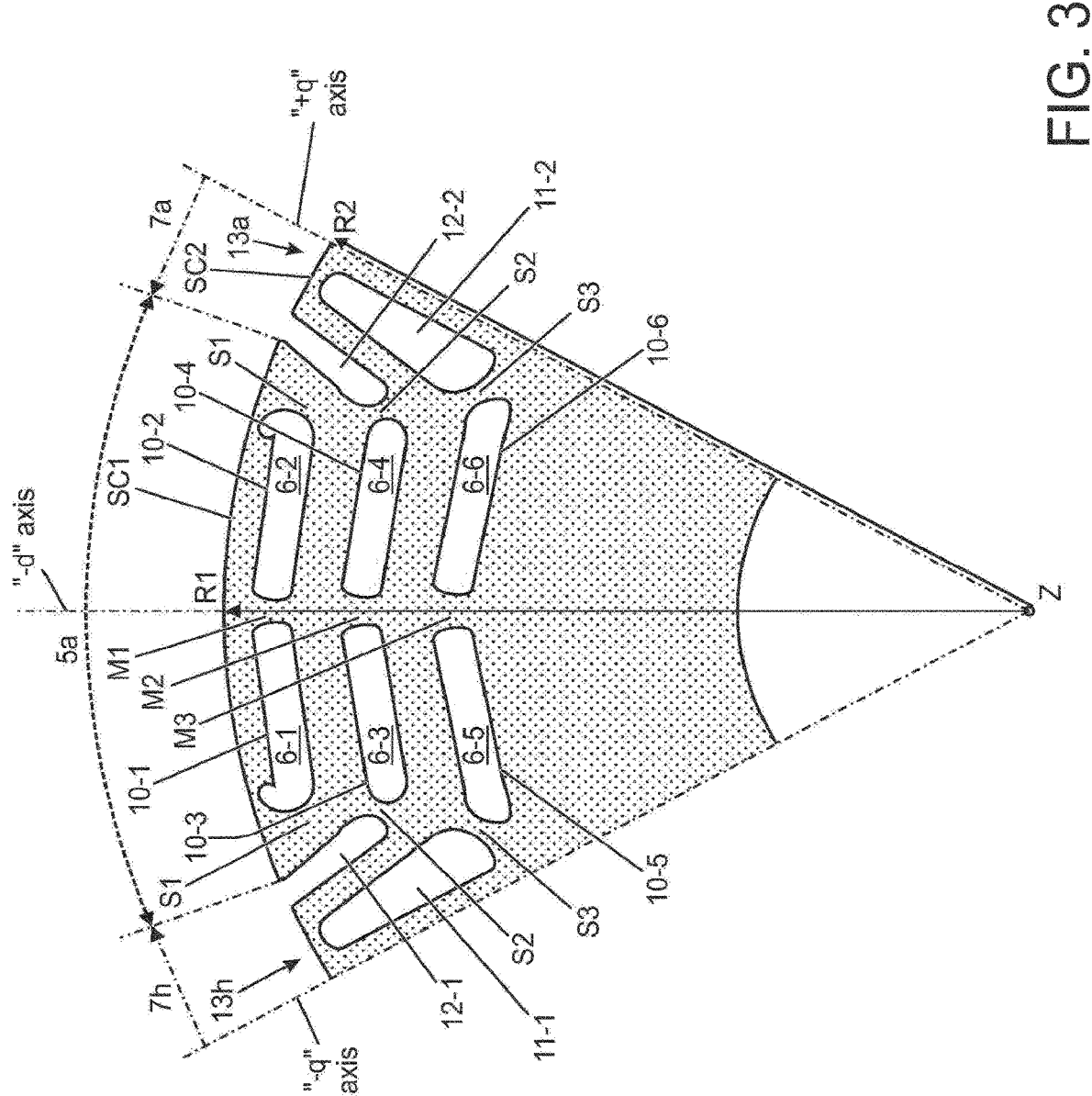

ROTOR FOR AN ELECTRIC MACHINE

RELATED APPLICATIONS

This application is a 35 U.S.C. § 371 national stage application of PCT Application No. PCT/EP2017/080039, filed on Nov. 22, 2017, which claims priority from Great Britain Patent Application No. 1619856.6, filed on Nov. 24, 2016, the contents of which are incorporated herein by reference in their entireties. The above-referenced PCT International Application was published in the English language as International Publication No. WO 2018/095969 A1 on May 31, 2018.

TECHNICAL FIELD

The present disclosure relates to an electric machine apparatus. Particularly, but not exclusively, the present disclosure relates to a rotor for an electric machine; to an electric machine comprising a rotor; and to a vehicle comprising an electric machine.

BACKGROUND

A particular design challenge for electric machines is the design of the rotor to reduce magnetic flux leakage between magnet poles. The positioning and arrangement of the permanent magnets affects the magnetic flux path within the rotor. The rotor may comprise flux barriers in the form of internal apertures for controlling the magnetic flux generated by the permanent magnets. At least in certain embodiments, the present invention seeks to reduce magnetic flux leakage within the rotor of an electric machine.

SUMMARY OF THE INVENTION

Aspects of the present invention relate to a rotor for an electric machine; to an electric machine comprising a rotor; and to a vehicle as claimed in the appended claims.

According to an aspect of the present invention there is provided a rotor for an electric machine, the rotor comprising:

a plurality of magnet poles each comprising a plurality of permanent magnets, the magnet poles being angularly separated from each other and an inter-pole region being formed between adjacent magnet poles;

the permanent magnets being arranged in at least first and second layers in each magnet pole, the first and second layers being radially offset from each other and the first layer being disposed in a radially outer position;

wherein first and second external flux barriers are disposed in each said inter-pole region, the first and second external flux barriers each comprising an external aperture, the first and second external flux barriers being associated with the permanent magnets in the second layer. Each external aperture is open to an exterior of the rotor. For example, each external aperture may form an open channel in an outer surface of the rotor. The open channel may extend substantially parallel to a longitudinal axis of the rotor. The at least one external flux barrier is adapted to reduce flux leakage from the magnet pole. At least in certain embodiments, the magnetic flux at the outer surface of the rotor may be reduced proximal to the external flux barrier.

The rotor may comprise first and second external flux barriers in each said inter-pole region. The first and second external flux barriers may be symmetrical about a central inter-pole axis of each said inter-pole region. The first and second external flux barriers may be angularly separated from each other. The first and second external flux barriers may form an inter-pole tooth. The inter-pole tooth may be formed between said first and second external flux barriers. The rotor may comprise more than two external flux barriers. For example, the rotor may comprise a third external flux barrier; and optionally a fourth external flux barrier.

The rotor may comprise a third external flux barrier in each said inter-pole region. The rotor may comprise a fourth external flux barrier in each said inter-pole region. The third and fourth external flux barriers may be disposed between said first and second external flux barriers in each said inter-pole region. The third and fourth external flux barriers may be symmetrical about a central inter-pole axis of each inter-pole region.

Each magnet pole has a first radius may comprise a part-cylindrical outer surface. Each inter-pole tooth may comprise a part-cylindrical outer surface.

The magnet poles may each have a first outer surface having a first radius. The inter-pole teeth may each have a second outer surface having a second radius. The first and second radii may be the same as each other. Alternatively, the first and second radii may be different from each other. The first radius may be less than said second radius. Alternatively, the first radius may be greater than said second radius.

The first outer surface may form part of a first circular cylinder. The first outer surface may comprise a first circular arc in transverse section. Alternatively, the first outer surface may form part of a first non-circular cylinder. The first outer surface may comprise a non-circular arc in transverse section.

The second outer surface may form part of a second circular cylinder. The second outer surface may comprise a second circular arc in transverse section. Alternatively, the second outer surface may form part of a second non-circular cylinder. The second outer surface may comprise a non-circular arc in transverse section.

At least one internal flux barrier may be provided in each said inter-pole region. The at least one internal flux barrier may comprise an internal aperture. The term internal aperture is used herein to refer to an aperture which is inset from the outer surface of the rotor. Thus, the internal aperture does not interrupt the outer surface of the inter-pole region. First and second internal flux barriers may be provided in each said inter-pole region.

The at least one external flux barrier may be disposed between said first and second internal flux barriers within each said inter-pole region.

In embodiments in which first and second external flux barriers are provided in each said inter-pole region, the at least one internal flux barrier may be disposed between said first and second external flux barriers within each said inter-pole region.

The rotor may comprise a first inter-pole region having a first central inter-pole axis. Within the first inter-pole region, each internal flux barrier may be disposed in an inner position proximal to the first central inter-pole axis and each external flux barrier may be disposed in an outer position distal from the first central inter-pole axis.

The rotor may comprise a second inter-pole region having a second central inter-pole axis. Within the second inter-pole region, each internal flux barrier may be disposed in an outer position distal from the second central inter-pole axis and each external flux barrier may be disposed in an inner position proximal to the second central inter-pole axis.

The first and second inter-pole regions may be arranged consecutively within the rotor. The consecutive arrangement of said first and second inter-pole regions may be repeated around the rotor.

The one or more permanent magnet may be arranged in one or more layer in each magnet pole. Each magnet pole may comprise one or more layer of said permanent magnet. For example, each magnet pole may comprise first, second and third layers each comprising one or more permanent magnet. The at least one internal flux barrier may be associated with respective layer(s) in the magnet pole.

According to a further aspect of the present invention there is provided an electric machine comprising a rotor as described herein. The electric machine may be a permanent magnet synchronous machine.

According to a still further aspect of the present invention there is provided a vehicle comprising an electric machine as described herein. The electric machine may be configured to generate a traction force for propelling the vehicle. The electric machine may be used as the sole means of propelling the vehicle or may be used in conjunction with another torque generating machine, such as an internal combustion engine.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which:

FIG. 3 shows an enlarged view of a magnet pole of the electric machine shown in FIG. 1;

DETAILED DESCRIPTION

Figure 1:
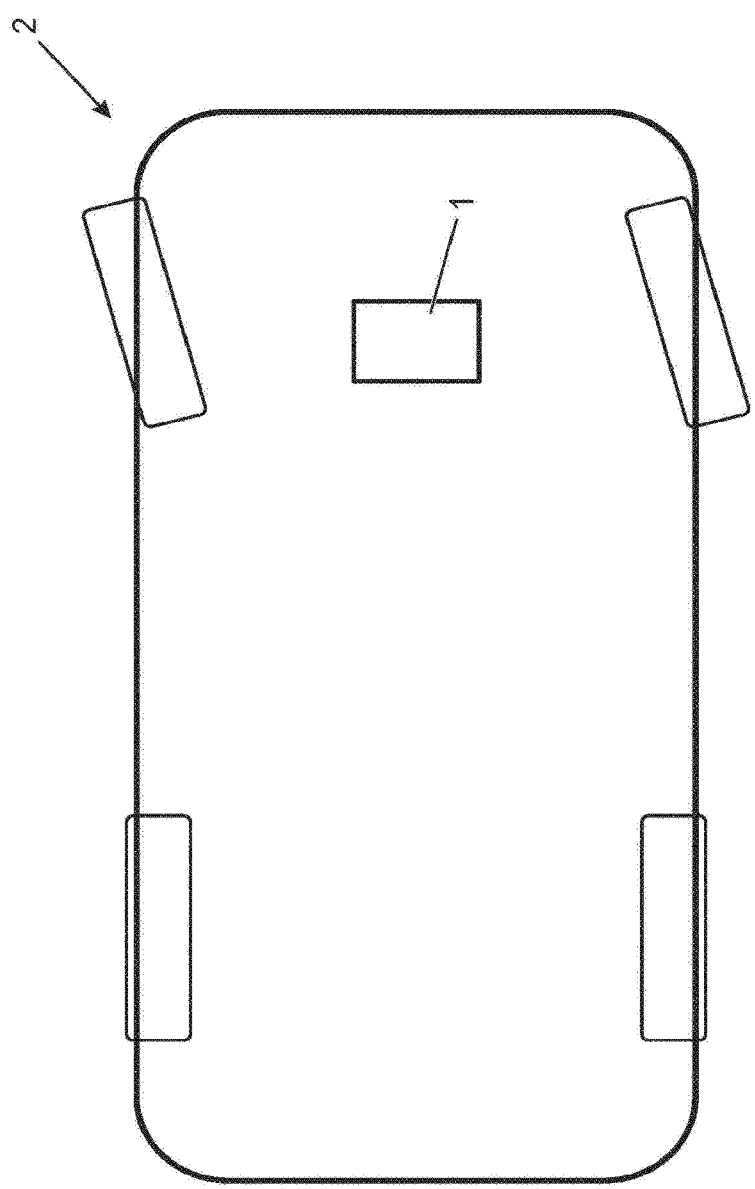
FIG. 1 shows a schematic illustration of a vehicle comprising an electric machine in accordance with an embodiment of the present invention.

An electric machine 1 in accordance with an embodiment of the present invention will now be described. The electric machine 1 in the present embodiment is configured for use as a traction drive in a motor vehicle 2, as shown schematically in FIG. 1.

Figure 2A:
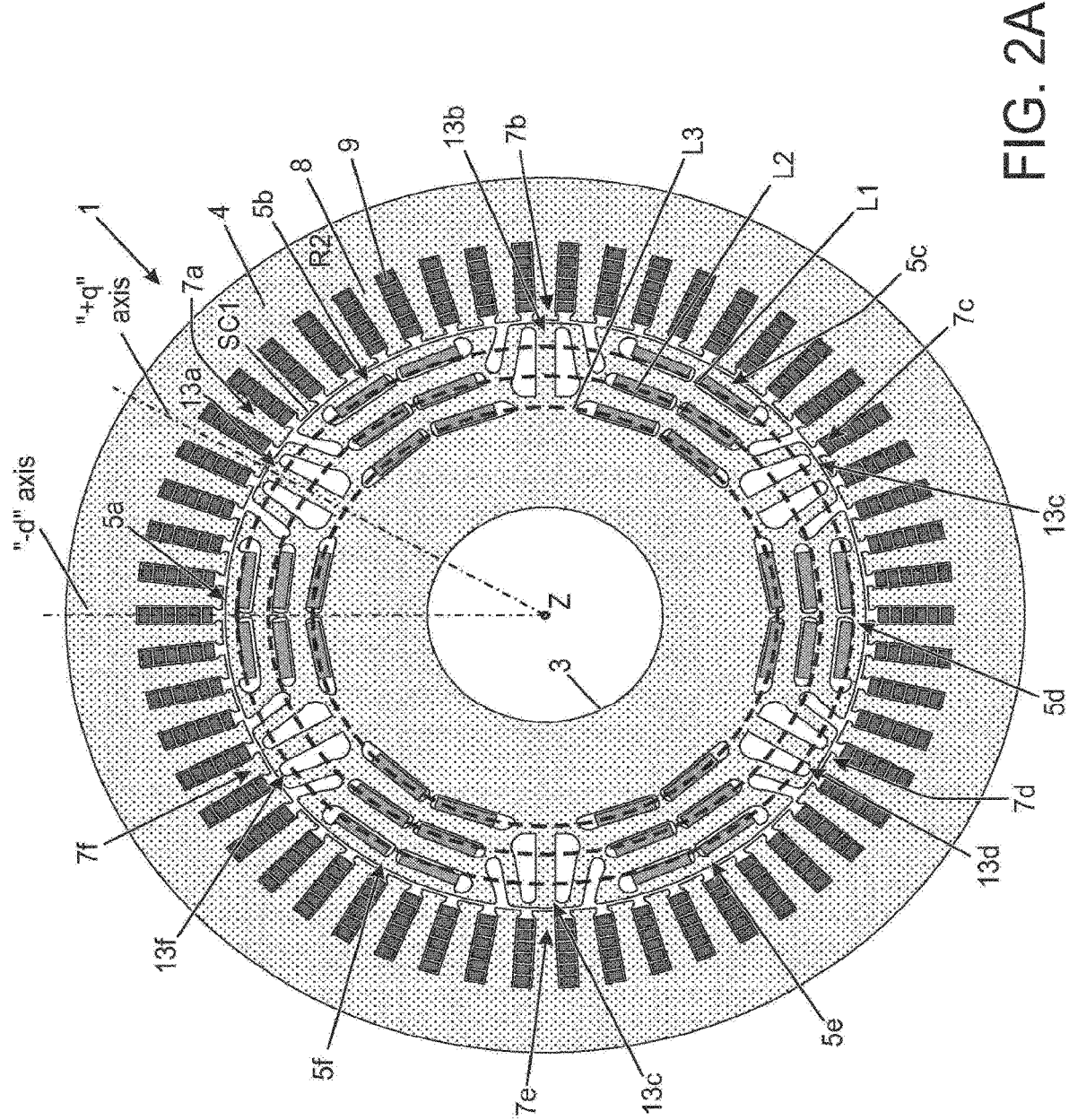
FIG. 2A shows a transverse section through an electric machine shown in FIG. 1 in accordance with an embodiment of the present invention.

With reference to FIG. 2A, the electric machine 1 is a permanent magnet synchronous motor comprising a rotor 3 and a stator 4. An air gap is maintained between the rotor 3 and the stator 4. The rotor 3 is made up of a plurality of laminations of a ferromagnetic material to form a rotor iron. The rotor 3 is configured to rotate about a rotational axis Z (extending perpendicular to the plane of the page in FIG. 2A). The rotor 3 comprises six (6) magnet poles 5a-f each comprising six (6) permanent magnets 6-n (where n represents the number of magnets in each of said magnet poles 5a-f). In alternate embodiments, the rotor 3 may comprise less than or more than six (6) magnet poles 5a-f. Moreover, each magnet pole 5a-f may comprise less than or more than six (6) magnets 6-n. The stator 4 comprises a plurality of stator teeth 8 extending radially inwardly to support coil windings 9. In the present arrangement, the stator 4 comprises fifty-four (54) stator teeth 8 such that there are nine (9) stator teeth 8 for each magnet pole 5. The permanent magnets 6-n generate a magnetic flux and a torque is generated to drive the rotor 3 by energising the coil winding 9.

The magnet poles 5a-h are angularly separated from each other and an inter-pole region 7a-h is formed between adjacent magnet poles 5a-f. The magnet poles 5a-f each extend radially outwardly from the rotational axis Z of the rotor 3 and have a part-cylindrical first outer surface SC1. In the present embodiment the first outer surface SC1 forms a part of a circular cylinder having a first radius R1. The magnet poles 5a-f all have the same general configuration. An assumed reference frame for the first magnet pole 5a comprises a pole axis (d-axis) aligned to the permanent magnet flux of the first magnet pole 5a. An inter-pole axis (q-axis) arranged transverse to the direction of the first magnet pole 5a (i.e. transverse to the pole axis (d-axis)) forms a centre-line of the inter-pole regions 7a-h. The angular separation of the d-axes of adjacent magnet poles 5a-f is 60°. The angular separation of the pole axis (d-axis) of the first magnet pole 5a and the inter-pole axis (q-axis) of an adjacent first inter-pole region 7a is 30° in the present embodiment. In a variant, the first outer surface SC1 may form a part of a non-circular cylinder.

Figure 2B:
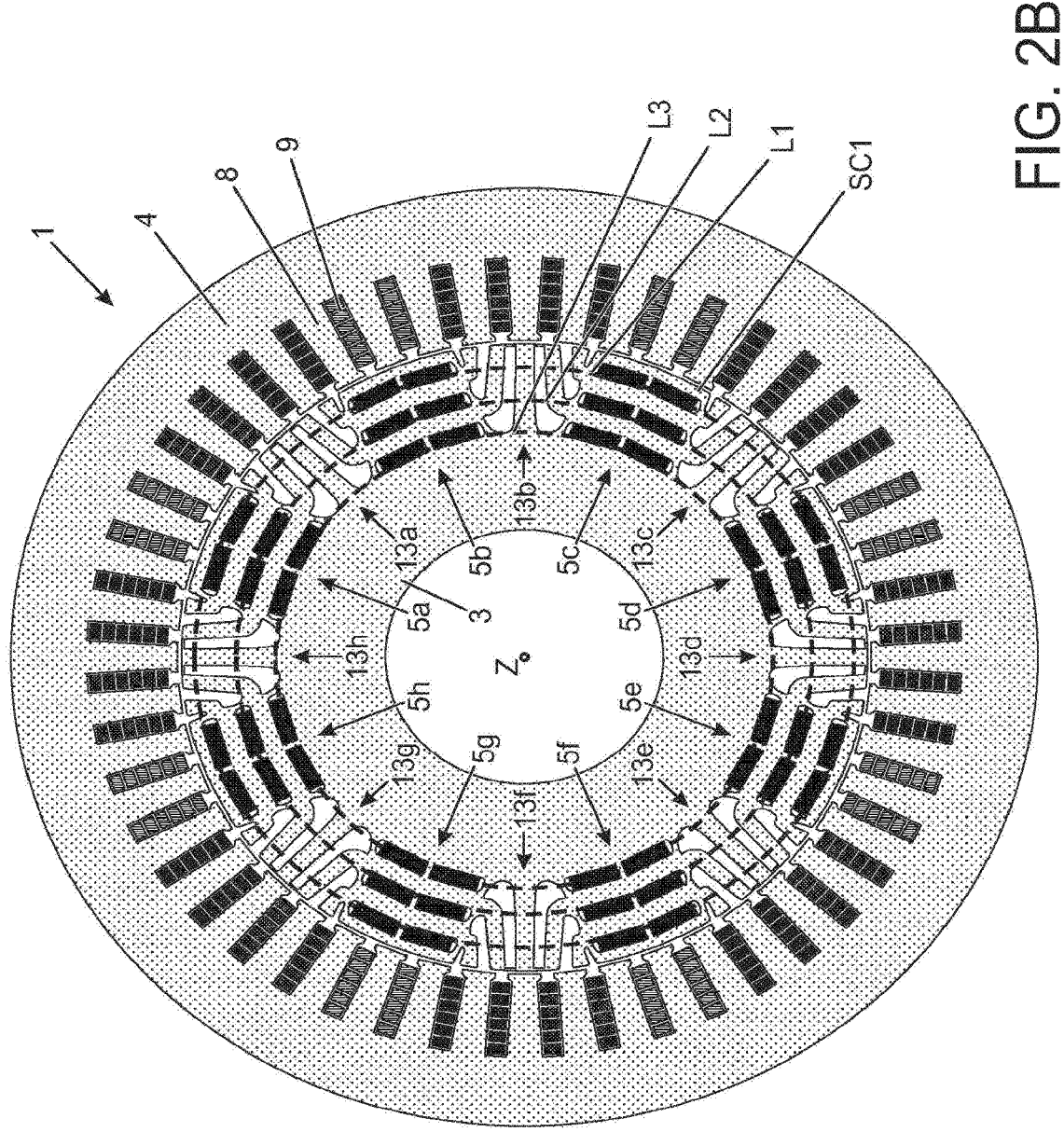
FIG. 2B shows a transverse section through an electric machine shown in FIG. 1 in accordance with a further embodiment of the present invention.
Figure 2C:
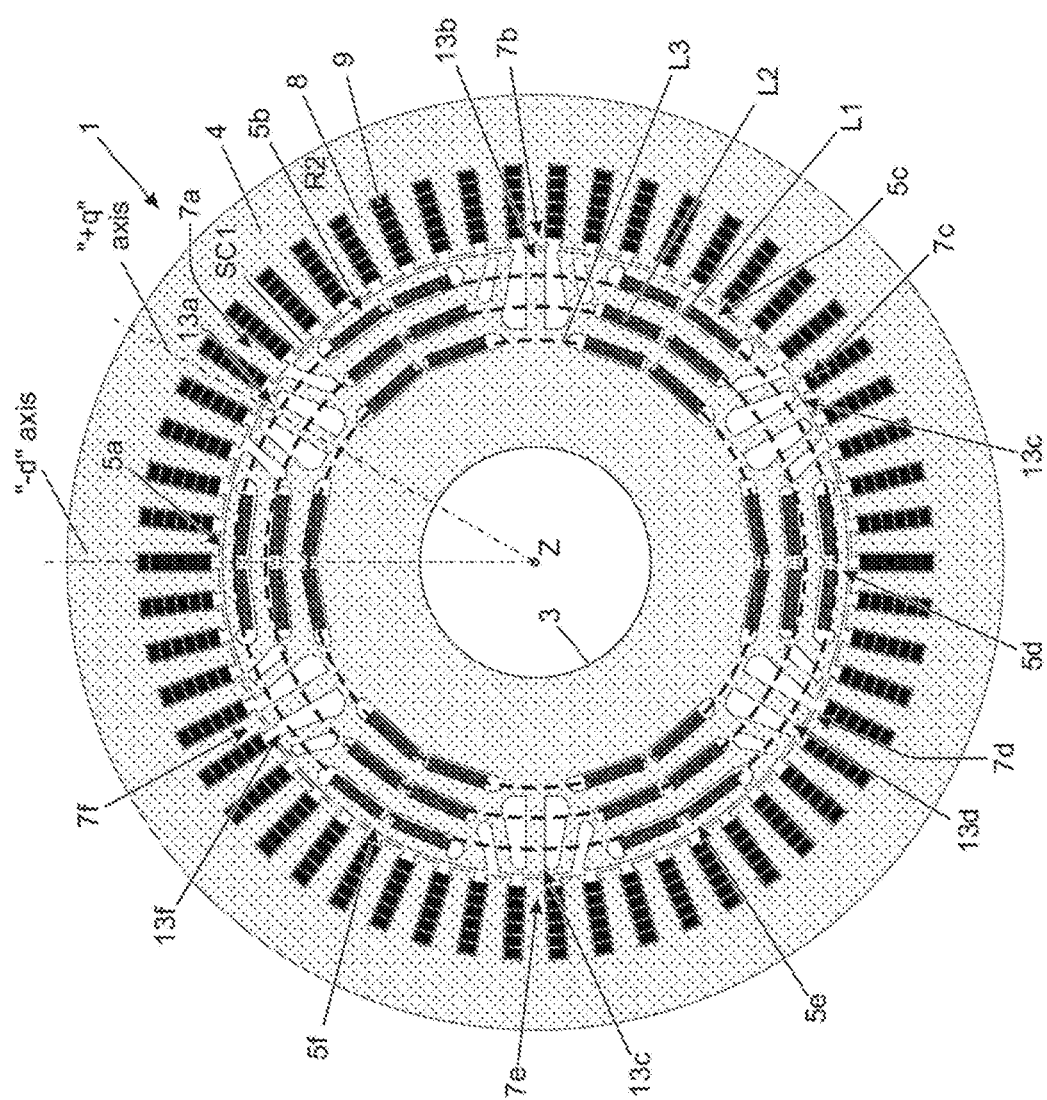
FIG. 2C shows a transverse section through an electric machine shown in FIG. 1 in accordance with a further embodiment of the present invention.

The electric machine 1 in accordance with further embodiments of the present invention are shown in FIGS. 2B and 2C. The electric machine 1 is a permanent magnet synchronous motor comprising a rotor 3 and a stator 4. The rotor 3 comprises eight (8) magnet poles 5$a$-$h$. The magnet poles 5$a$-$h$ each comprises three (3) permanent magnet 8-$n$ (where n represents the number of magnets in each of said magnet poles 5$a$-$h$). The stator 4 comprises a plurality of stator teeth 8 extending radially inwardly to support coil windings 9. In the present arrangement, the stator 4 comprises forty-eight (48) stator teeth 8 such that there are nine (9) stator teeth 8 for each magnet pole 5. The magnet poles 5-$h$ of this variant of the rotor 3 will now be described.

The magnet poles 5$a$-$h$ are angularly separated from each other and an inter-pole region 7$a$-$h$ is formed between adjacent magnet poles 5$a$-$h$. The magnet poles 5$a$-$h$ each extend radially outwardly from the rotational axis Z of the rotor 3 and have a part-cylindrical first outer surface SC1. In the present embodiment the first outer surface SC1 forms a part of a circular cylinder having a first radius R1. The magnet poles 5$a$-$h$ all have the same general configuration. For the sake of brevity, only a first magnet pole 5$a$ will be described herein. An assumed reference frame for the first magnet pole 5$a$ is shown in FIG. 3. The reference frame comprises a pole axis (d-axis) aligned to the permanent magnet flux of the first magnet pole 5$a$. An inter-pole axis (q-axis) arranged transverse to the direction of the first magnet pole 5$a$ (i.e. transverse to the pole axis (d-axis)) forms a centre-line of the inter-pole regions 7$a$-$h$. The angular separation of the d-axes of adjacent magnet poles 5$a$-$h$ is 45°. The angular separation of the pole axis (d-axis) of the first magnet pole 5$a$ and the inter-pole axis (q-axis) of an adjacent first inter-pole region 7$a$ is 22.5° in the present embodiment. In a variant, the first outer surface SC1 may form a part of a non-circular cylinder.

The first magnet pole 5$a$ comprises six (6) permanent magnets. The permanent magnets 6-$n$ are each mounted in a respective magnet aperture 10-$n$ formed in the rotor 3. The magnet apertures 10-$n$ are internal apertures which extend substantially parallel to the rotational axis Z. The permanent magnets 6-$n$ in the first magnet pole 5$a$ are arranged in first, second and third layers L1-L3. As shown in FIG. 2B, the first, second and third layers L1-L3 are arranged concentrically about the rotational axis Z of the rotor 3 with a radial offset between each of the first, second and third layers L1-L3. The first layer L1 is disposed in a radially outer position and the third layer L3 is disposed in a radially inner position. The first, second and third layers L1-L3 within the first pole 5$a$ each comprise a plurality of said permanent magnets 6-$n$ arranged symmetrically about the pole axis (d-axis) of the first magnet pole 5$a$. In the present embodiment the first, second and third layers L1-L3 each consist of two (2) permanent magnets 6-$n$ disposed on opposing sides of the pole axis (d-axis) in a symmetrical arrangement. In an alternative embodiment, the permanent magnets 6-$n$ in the first magnet pole 5$a$ may be arranged in one or two layers. Alternatively, or in addition, each layer may have three or more permanent magnets 6-$n$.

The inter-pole regions 7$a$-$h$ each comprise first and second internal flux barriers 11-1, 11-2 and first and second external flux barriers 12-1, 12-2. The first and second internal flux barriers 11-1, 11-2 and the first and second external flux barriers 12-1, 12-2 are provided to help ensure the appropriate flux density distribution at the lateral boundaries of the magnet poles 5$a$-$h$. The first and second internal flux barriers 11-1, 11-2 and the first and second external flux barriers 12-1, 12-2 are arranged symmetrically about the inter-pole axis (q-axis). In the present embodiment, the first and second internal flux barriers 11-1, 11-2 are positioned between the first and second external flux barriers 12-1, 12-2 within each said inter-pole region 7$a$-$h$. However, this arrangement may be reversed such that the first and second external flux barriers 12-1, 12-2 are positioned between the first and second internal flux barriers 11-1, 11-2 within each inter-pole region 7$a$-$h$. The first and second internal flux barriers 11-1, 11-2 are disposed on opposing sides of the permanent magnets 6-$n$ in the third layer L3; and the first and second external flux barriers 12-1, 12-2 are disposed on opposing sides of the permanent magnets 6-$n$ in the second layer L2. In the present embodiment the first and second internal flux barriers 11-1, 11-2 and the first and second external flux barriers 12-1, 12-2 each comprise an air-filled cavity elongated in a radial direction from the centre of the rotor 3. The first and second internal flux barriers 11-1, 11-2 are internal apertures (or holes) formed within the rotor 3 and are inset from the outer circumference of the rotor 3. The first and second external flux barriers 12-1, 12-2 are external apertures which are open to the outer circumference of the rotor 3. Thus, the first and second external flux barriers 12-1, 12-2 form open channels in the outer surface of the rotor 3. It will be understood that the internal flux barriers 11-1, 11-2 are surrounded by the ferromagnetic material of the rotor 3; and the external flux barriers 12-1, 12-2 are only partially surrounded by the ferromagnetic material of the rotor 3. As shown in FIG. 3, the open channels are elongated along a central axis which is arranged at an acute angle to the pole axis (d-axis) of the first magnet pole 5$a$. The first and second external flux barriers 12-1, 12-2 thereby delimit the first magnet pole 5$a$.

The first and second external flux barriers 12-1, 12-2 form an inter-pole tooth 13$a$-$h$ in each of the inter-pole regions 7$a$-$h$. The inter-pole teeth 13$a$-$h$ may be considered as forming reluctance poles for developing reluctance torque. The torque generated by the electric machine 1 may thereby be increased by forming said inter-pole teeth 13$a$-$h$ between the magnet poles 5$a$-$h$. Each inter-pole tooth 13$a$-$h$ has a part-cylindrical second outer surface SC2 having a second radius R2. In the present embodiment, the first and second radii R1, R2 are substantially the same. In variants, the first and second radii R1, R2 can be different. For example, the second radius R2 of the inter-pole tooth 13$a$-$h$ can be greater than the first radius R1 of the magnet poles 5$a$-$h$.

The magnet apertures 10-$n$, the first and second internal flux barriers 11-1, 11-2 and the first and second external flux barriers 12-1, 12-2 are apertures formed in the rotor 3. The apertures are formed by cut-outs in the laminations which are stacked to form the rotor 3. As shown in FIG. 3, a plurality of bridges (or ligaments) is formed in the rotor 3. First, second and third central bridges M1-M3 are formed between the magnet apertures 10-$n$ in the first, second and third layers L1-L3 respectively. First, second and third lateral bridges S1-S3 are formed on each side of the first magnet pole 5$a$. The first lateral bridges S1 are formed between the magnet apertures 10-1, 10-2 in the first layer L1 and the first and second external flux barriers 12-1, 12-2. The second lateral bridges S2 are formed between the magnet apertures 10-3, 10-4 in the second layer L2 and the first and second external flux barriers 12-1, 12-2. The third lateral bridges S3 are formed between the magnet apertures 10-5, 10-6 in the third layer L3 and the first and second internal flux barriers 11-1, 11-2.

Figure 4:
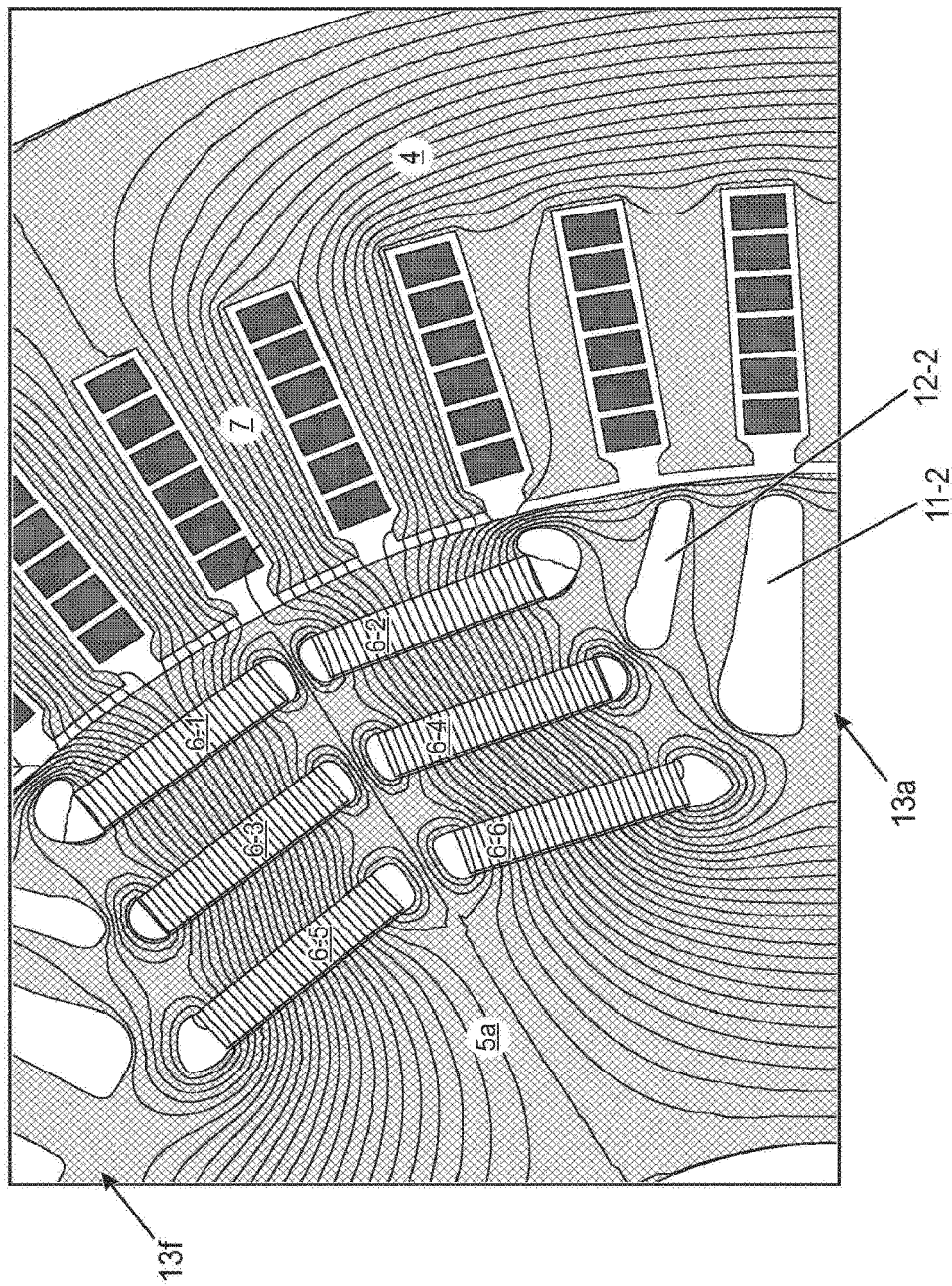
FIG. 4 shows the magnetic flux modelled in a rotor having a substantially continuous outer surface.
Figure 5:
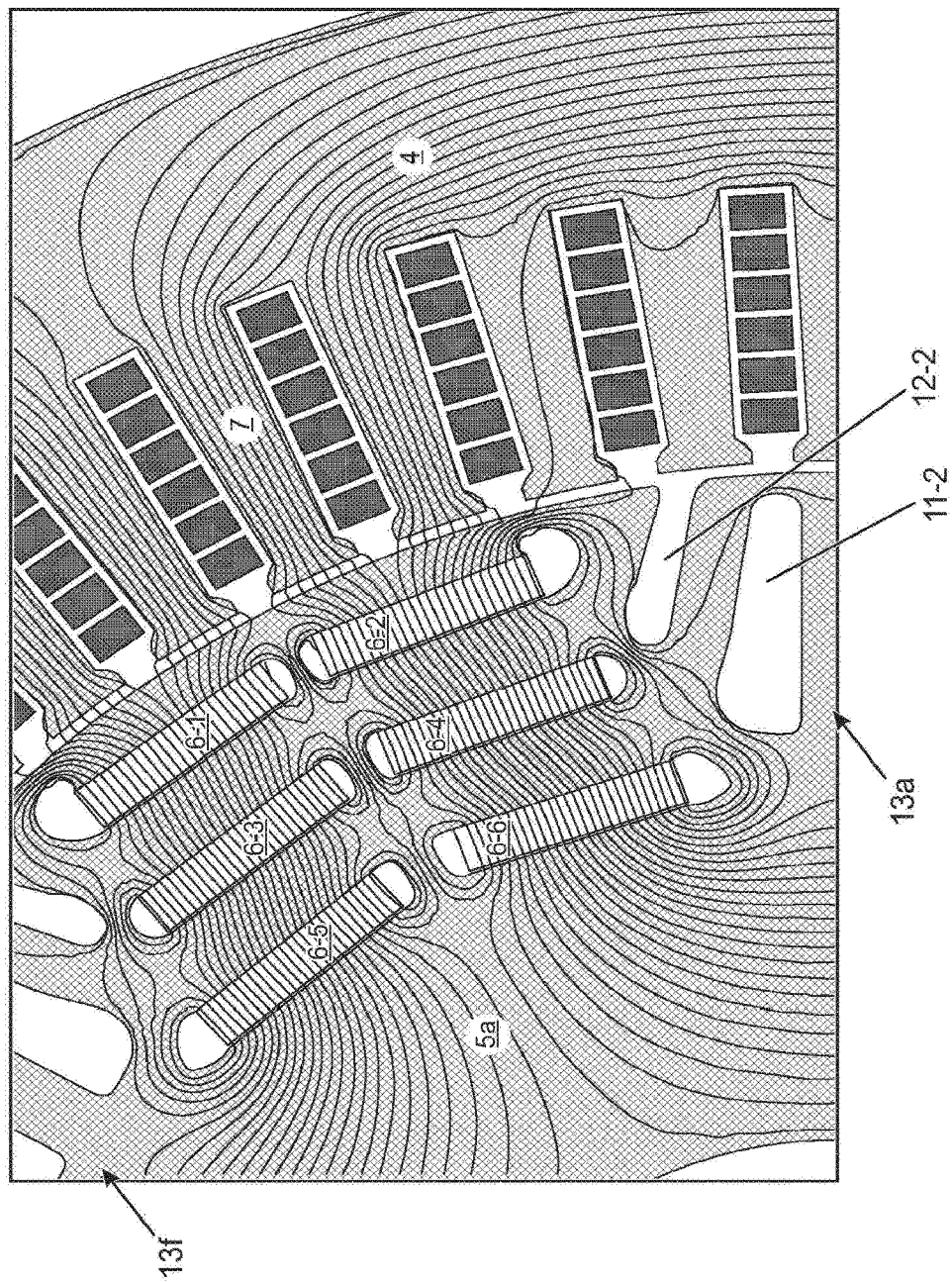
FIG. 5 shows the magnetic flux modelled in a rotor according to an embodiment of the present invention.

The results of a computational analysis of the magnetic flux in the first magnet pole 5$a$ will now be described with reference to FIGS. 4 and 5. The magnetic flux is illustrated in these figures by flux lines. The magnetic flux modelled in a first magnet pole having two pairs of internal flux barriers 11-1, 11-2 is illustrated in FIG. 4. The concentration of the magnetic flux in the region between each of the first and second internal flux barriers 11-1, 11-2 and the outer surface of the rotor 3 is visible in FIG. 4. The magnetic flux modelled in a first magnet pole 5a having first and second internal flux barriers 11-1, 11-2; and first and second external flux barriers 12-1, 12-2 in accordance with an embodiment of the present invention is illustrated in FIG. 5. The reduced concentration of the magnetic flux in the region between each of the first and second external flux barriers 12-1, 12-2 and the outer surface of the rotor 3 is visible in FIG. 5. The interruption in the rotor surface of the rotor 3 helps to reduce or inhibit flux leakage from one magnetic pole 5a-h to the next (adjacent) magnetic pole 5a-h. Thus, increased torque performance is possible for the electric machine 1.

Figure 6:
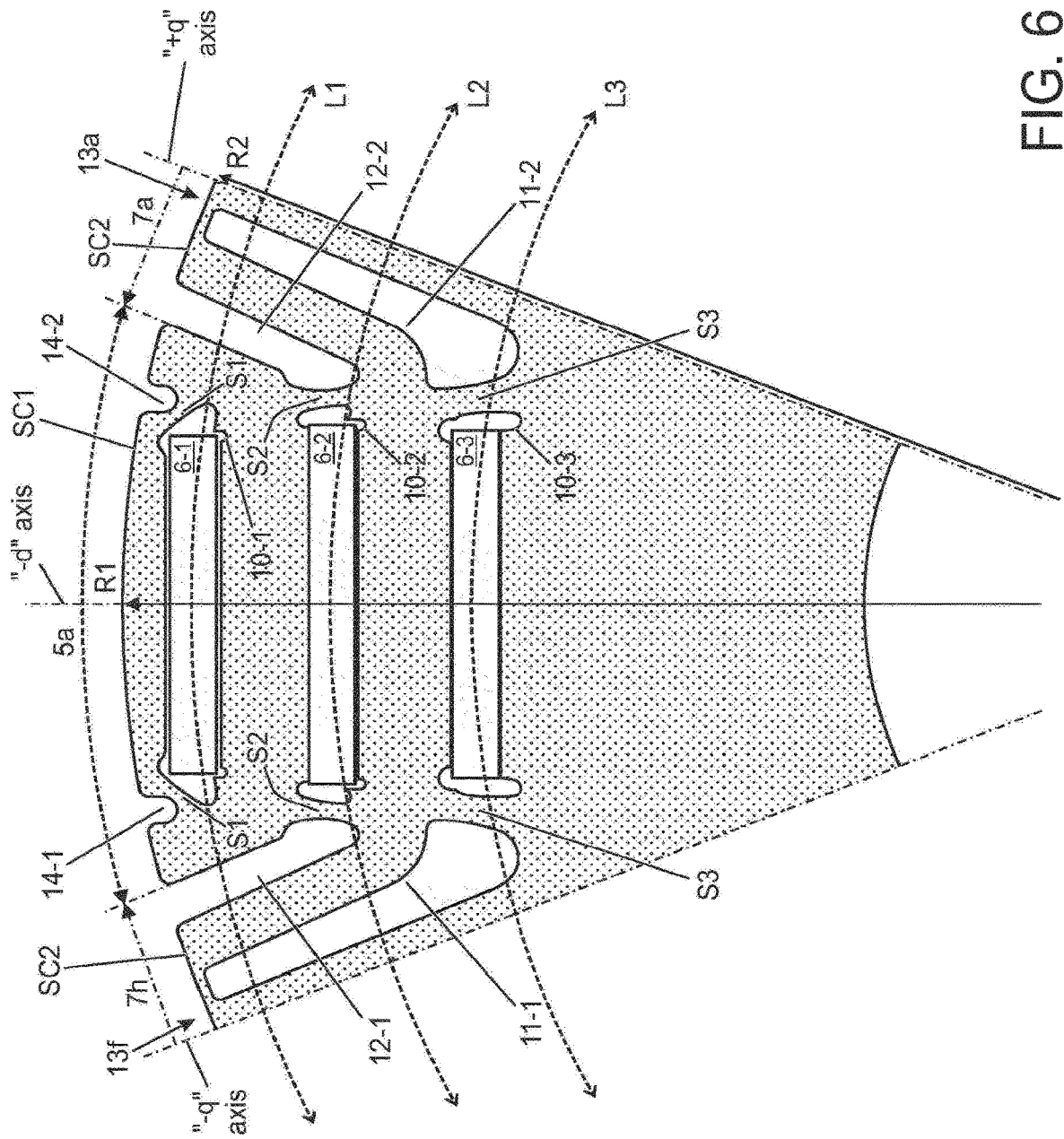
FIG. 6 shows a transverse section through a rotor of an electric machine in accordance with a further embodiment of the present invention.
Figure 7:
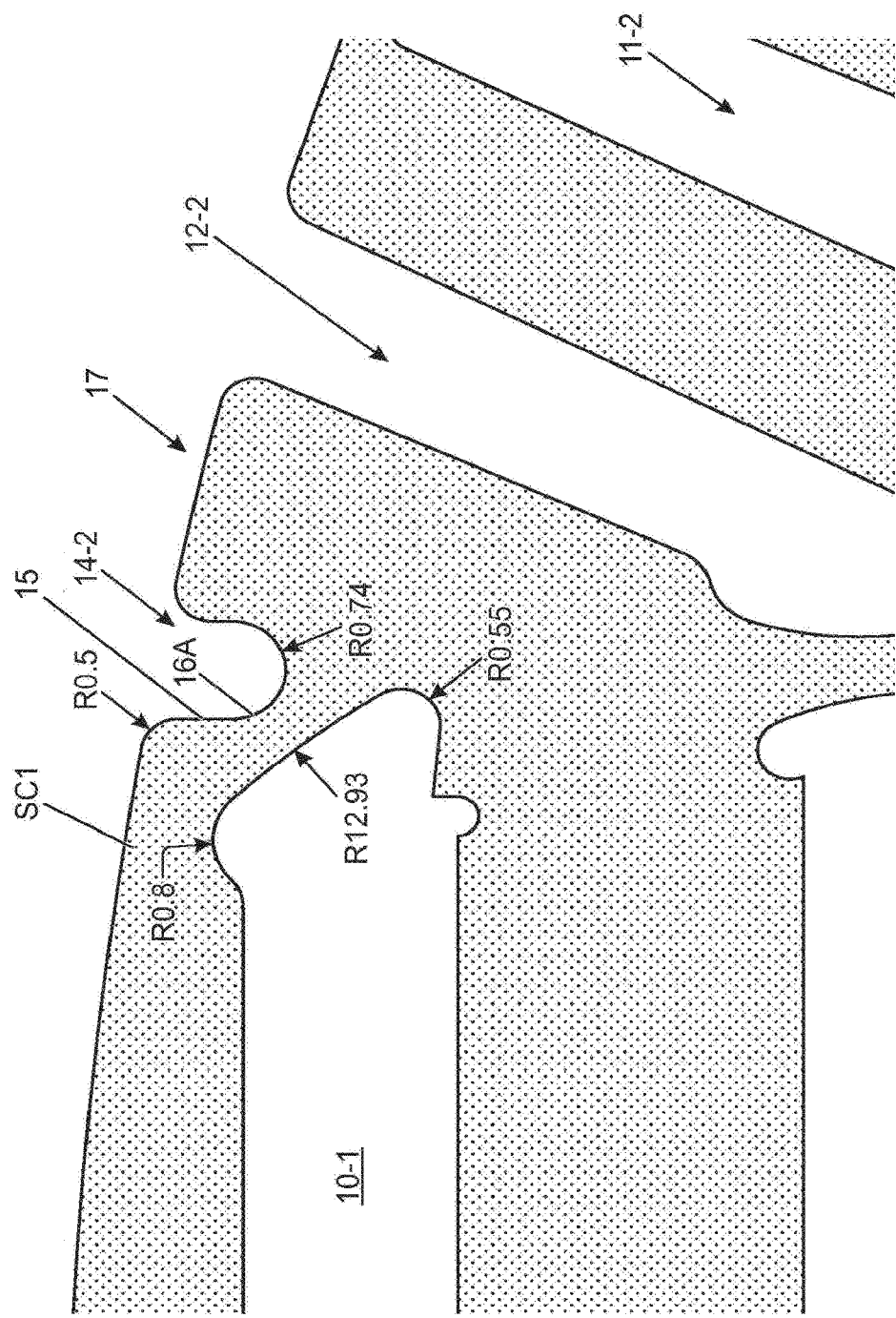
FIG. 7 shows an enlarged view of a magnet pole of the electric machine shown in FIG. 6.

A further embodiment of a rotor 3 in accordance with an aspect of the present invention is illustrated in FIGS. 6 and 7. The rotor 3 is a development of the embodiment described herein with reference to FIGS. 1 to 5. Like reference numerals are used for like components.

The rotor 3 is for use in an electric machine 1 of the type described herein with reference to FIG. 2B. The rotor 3 is made up of a plurality of laminations of a ferromagnetic material to form a rotor iron. The rotor 3 comprises eight (8) magnet poles 5a-h each comprising three (3) permanent magnets 6-n (where n represents the number of magnets in each of said magnet poles 5a-h). The permanent magnets 6-n are mounted such that the respective major longitudinal axis of each permanent magnet 6-n is disposed at least substantially perpendicular to the d-axis of the magnet pole 5a-h, as shown in the transverse section shown in FIGS. 6 and 7. The stator 4 comprises a plurality of stator teeth 8 extending radially inwardly to support coil windings 9.

The magnet poles 5a-h are angularly separated from each other and an inter-pole region 7a-h is formed between adjacent magnet poles 5a-h. The magnet poles 5a-h each extend radially outwardly from the rotational axis Z of the rotor 3 and have a part-cylindrical first outer surface SC1. In the present embodiment the first outer surface SC1 forms a part of a circular cylinder having a first radius R1. The magnet poles 5a-h all have the same general configuration. For the sake of brevity, only a first magnet pole 5a will be described herein. An assumed reference frame for the first magnet pole 5a is shown in FIG. 6. The reference frame comprises a pole axis (d-axis) aligned to the permanent magnet flux of the first magnet pole 5a. An inter-pole axis (q-axis) arranged transverse to the direction of the first magnet pole 5a (i.e. transverse to the pole axis (d-axis)) forms a centre-line of the inter-pole regions 7a-h. The angular separation of the d-axes of adjacent magnet poles 5a-h is 45°. The angular separation of the pole axis (d-axis) of the first magnet pole 5a and the inter-pole axis (q-axis) of an adjacent first inter-pole region 7a is 22.5° in the present embodiment. In a variant, the first outer surface SC1 may form a part of a non-circular cylinder.

The first magnet pole 5a comprises three (3) permanent magnets. The permanent magnets 6-n are each mounted in a respective magnet aperture 10-n formed in the rotor 3. The magnet apertures 10-n are internal apertures which extend substantially parallel to the rotational axis Z. The permanent magnets 6-n in the first magnet pole 5a are arranged in first, second and third layers L1-L3. The first, second and third layers L1-L3 are arranged concentrically about the rotational axis Z of the rotor 3 with a radial offset between each of the first, second and third layers L1-L3. The first layer L1 is disposed in a radially outer position and the third layer L3 is disposed in a radially inner position. The first, second and third layers L1-L3 within the first pole 5a each consist of one (1) permanent magnet 6-n.

The inter-pole regions 7a-h each comprise first and second internal flux barriers 11-1, 11-2 and first and second external flux barriers 12-1, 12-2. The first and second internal flux barriers 11-1, 11-2 and the first and second external flux barriers 12-1, 12-2 are provided to help ensure the appropriate flux density distribution at the lateral boundaries of the magnet poles 5a-h. The first and second internal flux barriers 11-1, 11-2 and the first and second external flux barriers 12-1, 12-2 are arranged symmetrically about the inter-pole axis (q-axis). In the present embodiment, the first and second internal flux barriers 11-1, 11-2 are positioned between the first and second external flux barriers 12-1, 12-2 within each said inter-pole region 7a-h. The first and second internal flux barriers 11-1, 11-2 are disposed on opposing sides of the permanent magnets 6-n in the third layer L3; and the first and second external flux barriers 12-1, 12-2 are disposed on opposing sides of the permanent magnets 6-n in the second layer L2. In the present embodiment the first and second internal flux barriers 11-1, 11-2 and the first and second external flux barriers 12-1, 12-2 each comprise an air-filled cavity elongated in a radial direction from the centre of the rotor 3. The first and second internal flux barriers 11-1, 11-2 are internal apertures (or holes) formed within the rotor 3 and are inset from the outer circumference of the rotor 3. The first and second external flux barriers 12-1, 12-2 are external apertures which are open to the outer circumference of the rotor 3. Thus, the first and second external flux barriers 12-1, 12-2 form open channels in the outer surface of the rotor 3. It will be understood that the internal flux barriers 11-1, 11-2 are surrounded by the ferromagnetic material of the rotor 3; and the external flux barriers 12-1, 12-2 are only partially surrounded by the ferromagnetic material of the rotor 3. The first and second external flux barriers 12-1, 12-2 thereby delimit the first magnet pole 5a.

The first and second external flux barriers 12-1, 12-2 form an inter-pole tooth 13a-h in each of the inter-pole regions 7a-h. The inter-pole teeth 13a-h may be considered as forming reluctance poles for developing reluctance torque. The torque generated by the electric machine 1 may thereby be increased by forming said inter-pole teeth 13a-h between the magnet poles 5a-h. Each inter-pole tooth 13a-h has a part-cylindrical second outer surface SC2 having a second radius R2. In the present embodiment, the first and second radii R1, R2 are substantially the same.

The first magnet pole 5a in the present embodiment comprises third and fourth external flux barriers 14-1, 14-2. The third and fourth external flux barriers 14-1, 14-2 are external apertures which are open to the outer circumference of the rotor 3. The third and fourth external flux barriers 14-1, 14-2 form open channels in the outer surface of the rotor 3. The third and fourth external flux barriers 14-1, 14-2 are only partially surrounded by the ferromagnetic material of the rotor 3. As shown in FIG. 6, the third and fourth external flux barriers 14-1, 14-2 are smaller than the first and second external flux barriers 12-1, 12-2.

The third and fourth external flux barriers 14-1, 14-2 have the same configuration as each other and are symmetrical about the d-axis of the first magnet pole 5a. An enlarged view of the fourth external flux barrier 14-2 is shown in FIG. 7. The fourth external flux barrier 14-2 comprises an arcuate sidewall 15 which is inset from the outer circumference of the rotor 3. In the present embodiment, the arcuate sidewall 15 comprises an inner circular arc 16A. The inner circular arc 16A is in the form of a semi-circle and has a radius of 0.74 mm. It will be understood that the dimensions of the third and fourth external flux barriers 14-1, 14-2 may be different for rotors 3 having different sizes and/or configurations. The third and fourth external flux barriers 14-1, 14-2 may control flux leakage from the magnet 6-1 disposed in the first layer L1 into a peripheral lateral region 17 of the first magnet pole 5a. As shown in FIG. 7, the peripheral lateral region 17 forms a corner portion of the first magnet pole 5a.

The magnet apertures 10-n, the first and second internal flux barriers 11-1, 11-2; the first and second external flux barriers 12-1, 12-2; and the third and fourth external flux barriers 14-1, 14-2 each comprise an aperture formed in the rotor 3. The apertures are formed by cut-outs in the laminations which are stacked to form the rotor 3. First, second and third lateral bridges S1-S3 are formed on each side of the first magnet pole 5a. The first lateral bridges S1 are formed between the magnet apertures 10-1 in the first layer L1 and the third and fourth external flux barriers 14-1, 14-2. As shown in FIG. 7, the third and fourth external flux barriers 14-1, 14-2 formed in the rotor 3 according to the present embodiment reduce the width of the first lateral bridges S1. The second lateral bridges S2 are formed between the magnet aperture 10-2 in the second layer L2 and the first and second external flux barriers 12-1, 12-2. The third lateral bridges S3 are formed between the magnet aperture 10-3 in the third layer L3 and the first and second internal flux barriers 11-1, 11-2.

Figure 8:
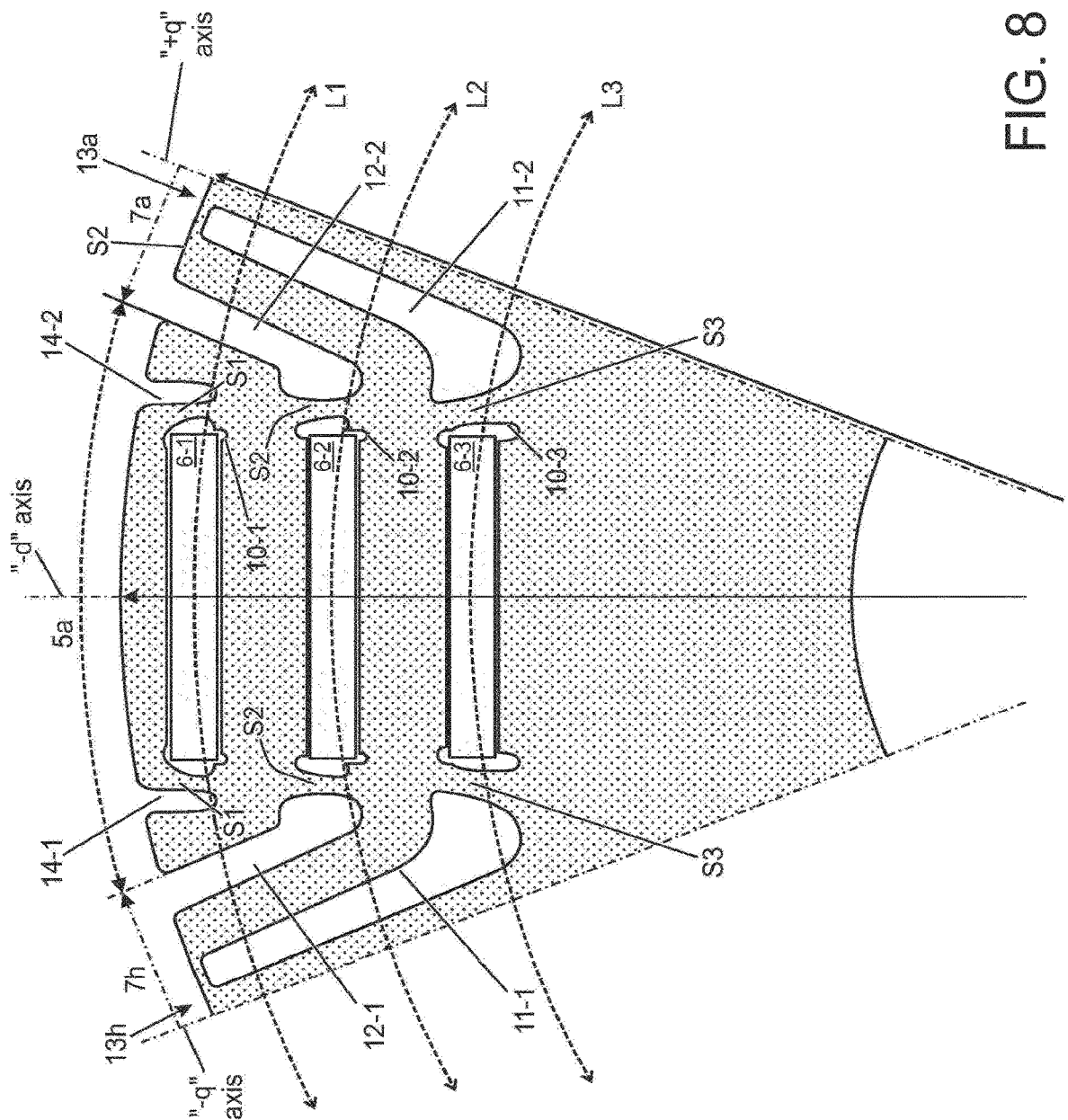
FIG. 8 shows a variant a rotor of an electric machine in accordance with an embodiment of the present invention.
Figure 9:
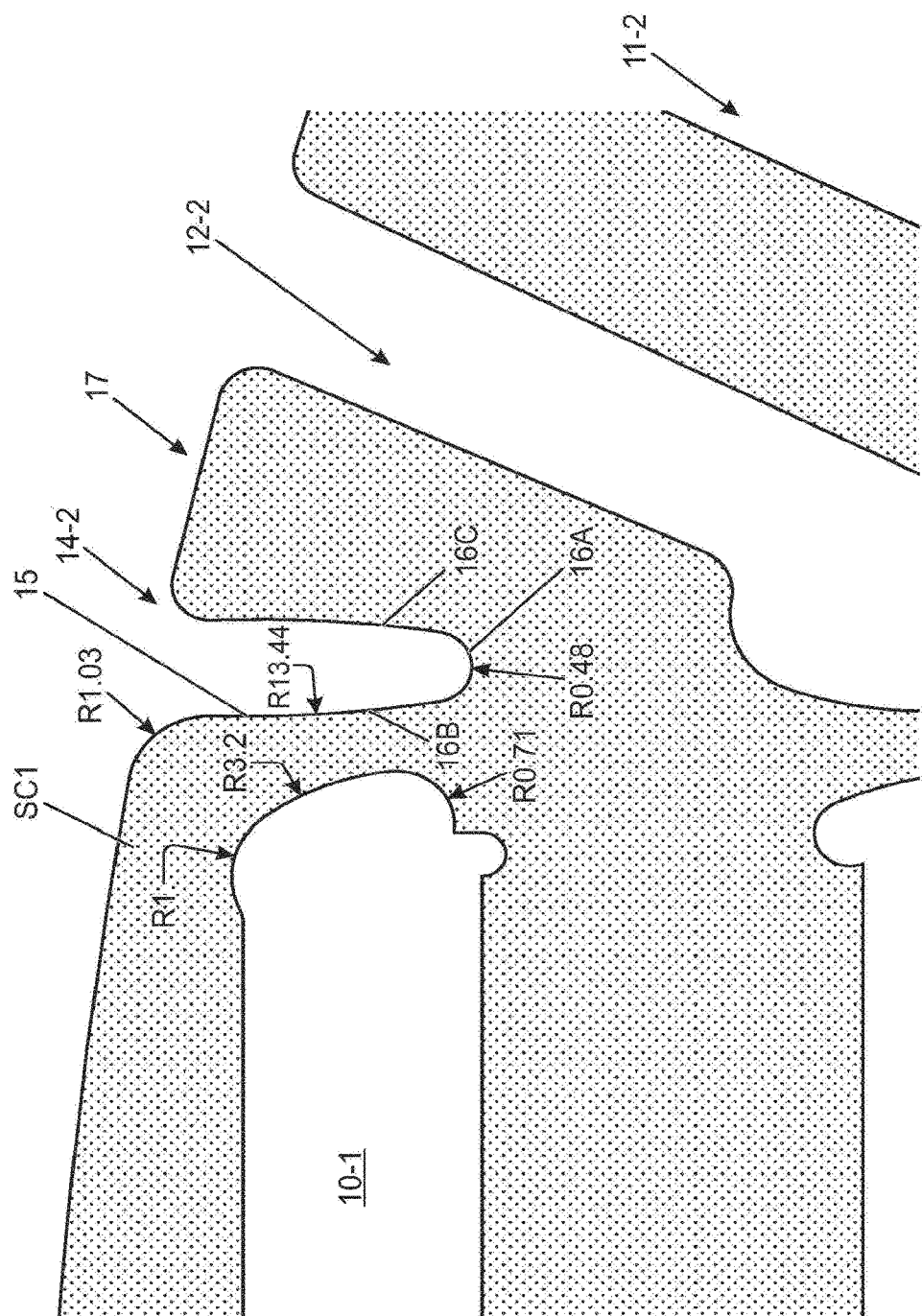
FIG. 9 shows an enlarged view of a magnet pole of the electric machine shown in FIG. 6.

A variant of the rotor 3 is shown in FIGS. 8 and 9. Like reference numerals are used for like components. The main changes in this variant relate to the profile of the first magnet aperture 10-2 and the third and fourth external flux barriers 14-1, 14-2. Thus, as shown in FIG. 9, the configuration of the first lateral bridge S1 is changed. The rotor 3 is a variant of the arrangement shown in FIG. 2. In this variant, the rotor 3 comprises eight (8) magnet poles 5a-h. The magnet poles 5a-h each comprises three (3) permanent magnet 8-n (where n represents the number of magnets in each of said magnet poles 5a-h).

The rotor 3 comprises six (6) magnet poles 5a-h each comprising three (3) permanent magnets 6-n (where n represents the number of magnets in each of said magnet poles 5a-h). The inter-pole regions 7a-h each comprise first and second internal flux barriers 11-1, 11-2 and first and second external flux barriers 12-1, 12-2. The first and second internal flux barriers 11-1, 11-2 and the first and second external flux barriers 12-1, 12-2 are arranged symmetrically about the inter-pole axis (q-axis). The first and second internal flux barriers 11-1, 11-2 are disposed on opposing sides of the permanent magnets 6-n in the third layer L3; and the first and second external flux barriers 12-1, 12-2 are disposed on opposing sides of the permanent magnets 6-n in the second layer L2. The first and second internal flux barriers 11-1, 11-2 and the first and second external flux barriers 12-1, 12-2 each comprise an air-filled cavity elongated in a radial direction from the centre of the rotor 3. The first and second internal flux barriers 11-1, 11-2 are internal apertures (or holes) formed within the rotor 3 and are inset from the outer circumference of the rotor 3. The first and second external flux barriers 12-1, 12-2 are external apertures which are open to the outer circumference of the rotor 3. Thus, the first and second external flux barriers 12-1, 12-2 form open channels in the outer surface of the rotor 3. It will be understood that the internal flux barriers 11-1, 11-2 are surrounded by the ferromagnetic material of the rotor 3; and the external flux barriers 12-1, 12-2 are only partially surrounded by the ferromagnetic material of the rotor 3. The first and second external flux barriers 12-1, 12-2 thereby delimit the first magnet pole 5a. The first and second external flux barriers 12-1, 12-2 form an inter-pole tooth 13a-h in each of the inter-pole regions 7a-h.

The first magnet pole 5a in the present embodiment comprises third and fourth external flux barriers 14-1, 14-2. The third and fourth external flux barriers 14-1, 14-2 are external apertures which are open to the outer circumference of the rotor 3. The third and fourth external flux barriers 14-1, 14-2 are only partially surrounded by the ferromagnetic material of the rotor 3. The third and fourth external flux barriers 14-1, 14-2 have the same configuration as each other and are symmetrical about the d-axis of the first magnet pole 5a. An enlarged view of the fourth external flux barrier 14-2 is shown in FIG. 9. The fourth external flux barrier 14-2 comprises a sidewall 15 which is inset from the outer circumference of the rotor 3. In the present embodiment, the sidewall 15 comprises first, second and third arcs 16A, 16B, 16C joined to each other to form a continuous curved surface. The first arc 16A comprises a circular arc in the form of a semi-circle having a radius of 0.48 mm. The second and third arcs form opposing sides of the fourth external barrier 14-1. In the present embodiment, the second and third arcs each consist of a circular arc having a radius of 13.44 mm.

The third and fourth external flux barriers 14-1, 14-2 extend into the rotor 3 on opposing sides of the first magnet aperture 10-1. As shown in FIG. 9, the depth of the third and fourth external flux barriers 14-1, 14-2 is at least substantially equal to an inner sidewall of the first magnet aperture 10-1. It will be understood that the dimensions of the third and fourth external flux barriers 14-1, 14-2 may be different for rotors 3 having different sizes and/or configurations. The third and fourth external flux barriers 14-1, 14-2 may control flux leakage from the magnet 6-1 disposed in the first layer L1 into a peripheral lateral region 17 of the first magnet pole 5a. As shown in FIG. 9, the peripheral lateral region 17 forms a corner portion of the first magnet pole 5a.

The magnet apertures 10-n, the first and second internal flux barriers 11-1, 11-2; the first and second external flux barriers 12-1, 12-2; and the third and fourth external flux barriers 14-1, 14-2 each comprise an aperture formed in the rotor 3. The apertures are formed by cut-outs in the laminations which are stacked to form the rotor 3. First, second and third lateral bridges S1-S3 are formed on each side of the first magnet pole 5a. The first lateral bridges S1 are formed between the magnet apertures 10-1 in the first layer L1 and the third and fourth external flux barriers 14-1, 14-2. As shown in FIG. 9, the third and fourth external flux barriers 14-1, 14-2 formed in the rotor 3 reduce the width of the first lateral bridges S1. The second lateral bridges S2 are formed between the magnet aperture 10-2 in the second layer L2 and the first and second external flux barriers 12-1, 12-2. The third lateral bridges S3 are formed between the magnet aperture 10-3 in the third layer L3 and the first and second internal flux barriers 11-1, 11-2.

Figure 10:
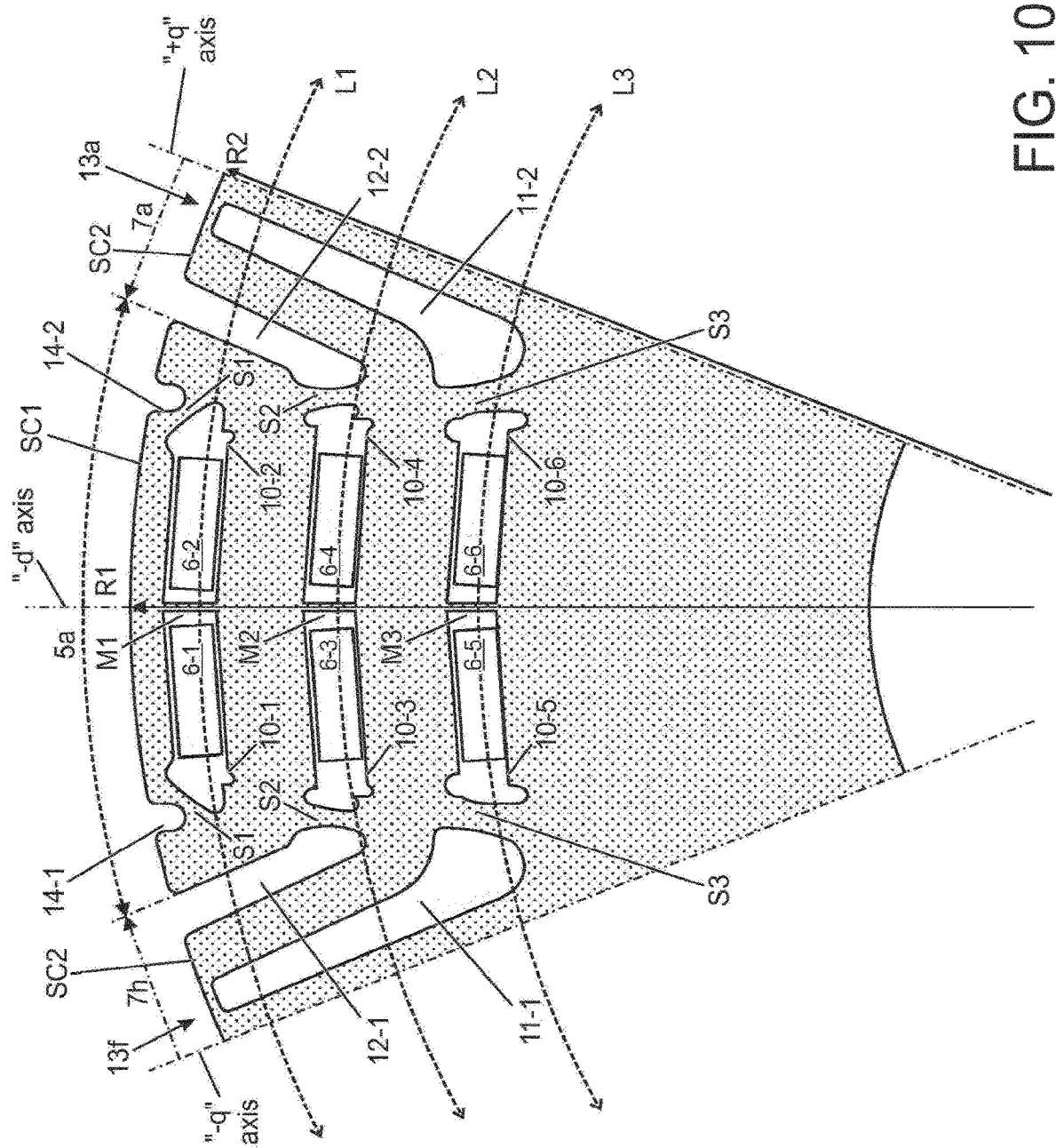
FIG. 10 shows a transverse section through a rotor of an electric machine in accordance with a further embodiment of the present invention.

A variant of the rotor 3 is shown in FIG. 10. Like reference numerals are used for like components. The main changes in this variant relate to the orientation of the permanent magnets 6-n in each magnet pole 5a-h. The rotor 3 comprises eight (8) magnet poles 5a-h, each having the same configuration.

The inter-pole regions 7a-h each comprise first and second internal flux barriers 11-1, 11-2; and first and second external flux barriers 12-1, 12-2. The first and second external flux barriers 12-1, 12-2 form an inter-pole tooth 13a-h in each of the inter-pole regions 7a-h. The first and second internal flux barriers 11-1, 11-2 are formed within respective inter-pole teeth 13a-h. The magnet poles 5a-h in the present embodiment also comprise third and fourth external flux barriers 14-1, 14-2. The third and fourth external flux barriers 14-1, 14-2 are external apertures which are open to the outer circumference of the rotor 3. The third and fourth external flux barriers 14-1, 14-2 have the same configuration as each other and are symmetrical about the d-axis of the first magnet pole 5a. The third and fourth external flux barriers 14-1, 14-2 extend into the rotor 3 on opposing sides of the first magnet aperture 10-1. The first and second external flux barriers 12-1, 12-2 and the third and fourth external flux barriers 14-1, 14-2 each comprise an external aperture which is open to the outer circumference of the rotor 3.

The first magnet pole 5a in the present embodiment comprises first and second internal flux barriers 11-1, 11-2; first and second external flux barriers 12-1, 12-2; third and fourth external flux barriers 14-1, 14-2. The external flux barriers 12-1, 12-2, 14-1, 14-2 each comprise an external aperture which is open to the outer circumference of the rotor 3. Each external flux barrier 12-1, 12-2, 14-1, 14-2 is only partially surrounded by the ferromagnetic material of the rotor 3. The first and second external flux barriers 12-1, 12-2 have the same configuration as each other and are arranged symmetrically about the inter-pole axis (q-axis). The third and fourth external flux barriers 14-1, 14-2 have the same configuration as each other and are arranged symmetrically about the inter-pole axis (q-axis).

Figure 11:
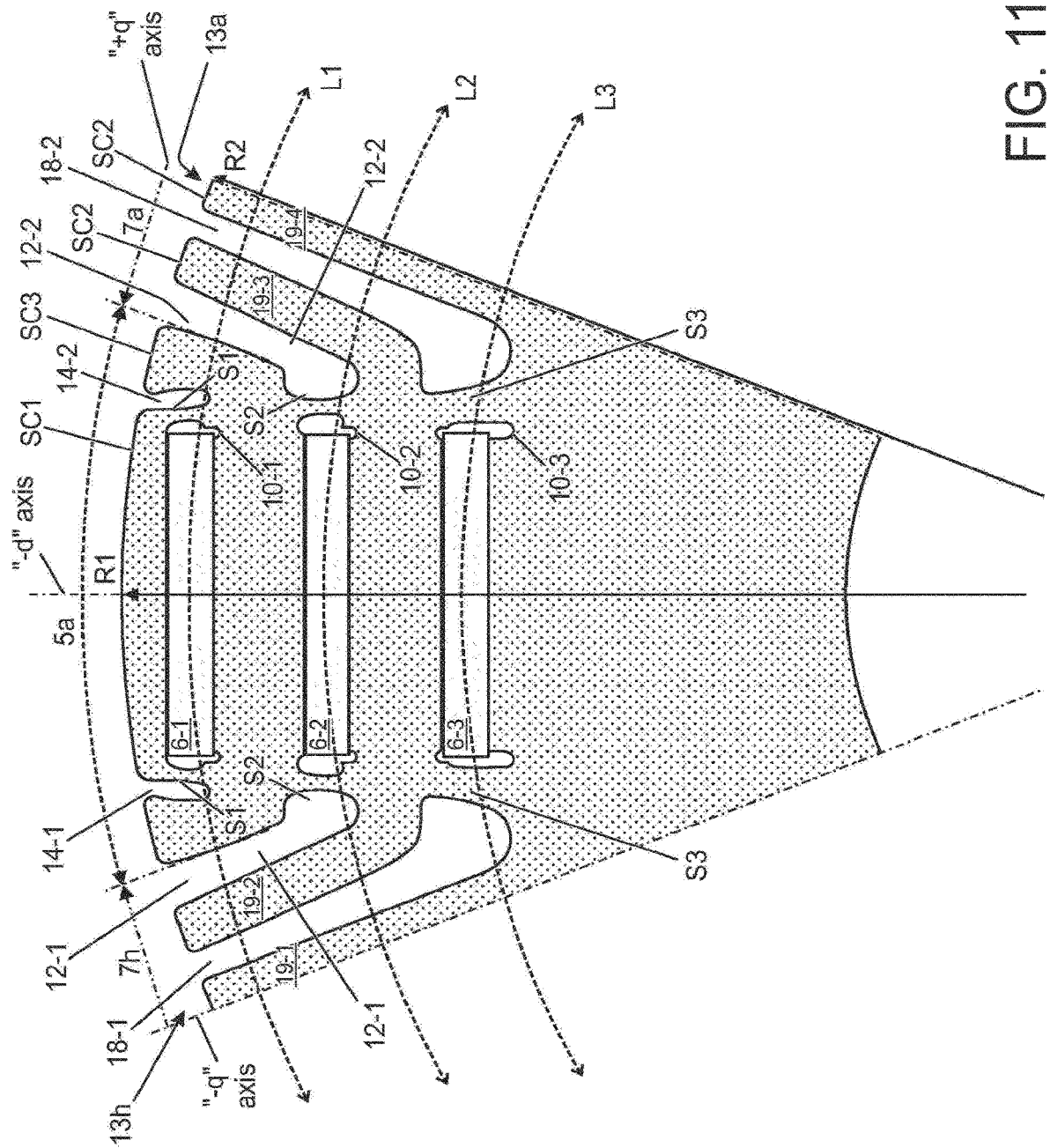
FIG. 11 shows a transverse section through a rotor of an electric machine in accordance with a further embodiment of the present invention.

Each magnet pole 5a-h in the present variant has six (6) permanent magnets 6-n disposed in respective magnet apertures 10-n. The rotor 3 is configured such that the major longitudinal axis of each permanent magnet 6-n is disposed at an acute angle to the d-axis of the magnet pole 5a-h, as shown in the transverse section shown in FIG. 10. Thus, the permanent magnets 6-n in each layer L1, L2, L3 have a generally inverted V configuration. First, second and third lateral bridges S1-S3 are formed on each side of the first magnet pole 5a. The first lateral bridges S1 are formed between the magnet apertures 10-1 in the first layer L1 and the third and fourth external flux barriers 14-1, 14-2. As shown in FIG. 11, the third and fourth external flux barriers 14-1, 14-2 formed in the rotor 3 reduce the width of the first lateral bridges S1. The second lateral bridges S2 are formed between the magnet aperture 10-2 in the second layer L2 and the first and second external flux barriers 12-1, 12-2. The third lateral bridges S3 are formed between the magnet aperture 10-3 in the third layer L3 and the first and second internal flux barriers 11-1, 11-2.

Figure 12:
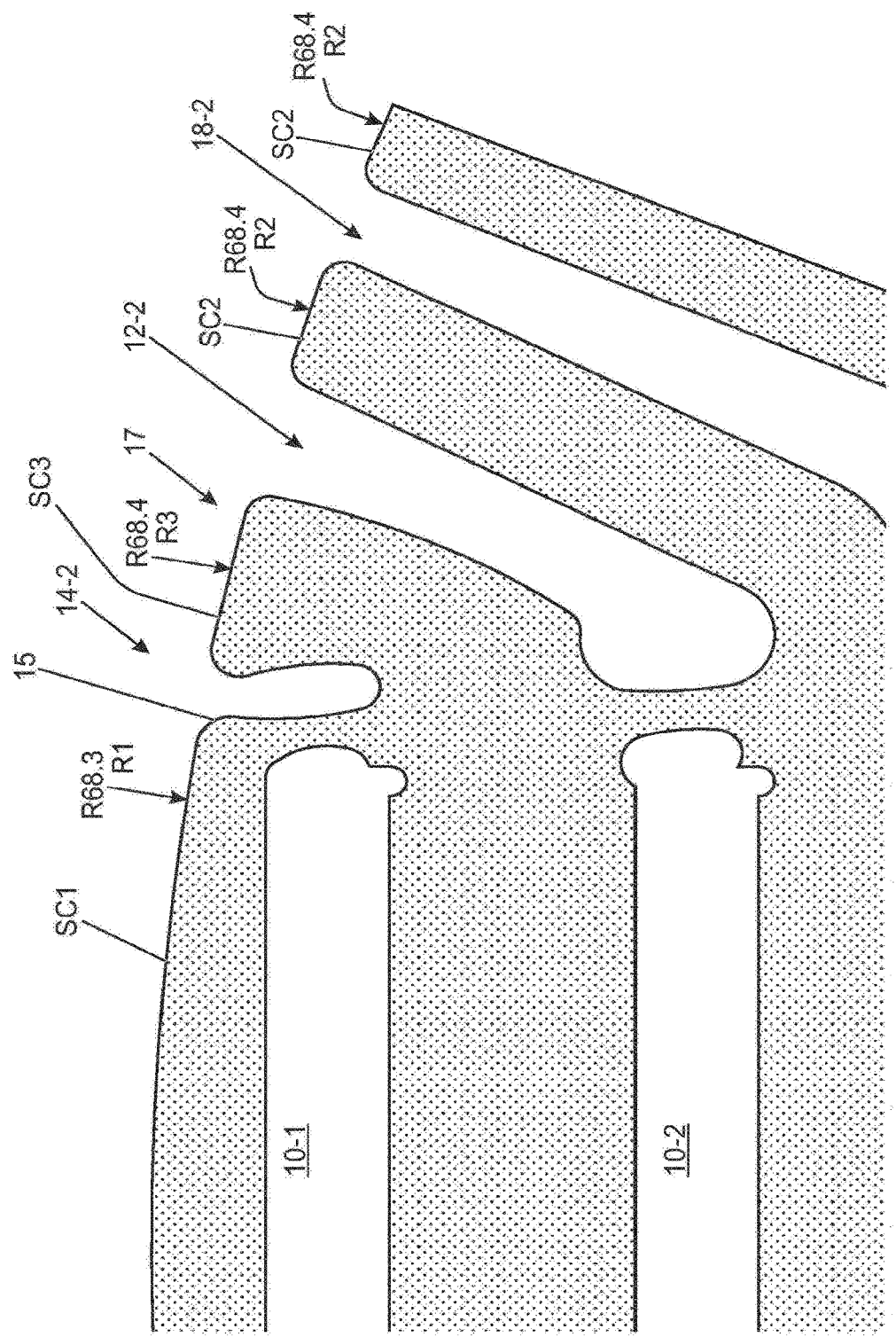
FIG. 12 shows an enlarged view of a magnet pole of the electric machine shown in FIG. 10.

A further embodiment of the rotor 3 is shown in FIGS. 11 and 12. Like reference numerals are used for like components. The main changes in this variant relate to the form of the flux barriers in the inter-pole regions 7a-h.

The rotor 3 according to the present embodiment comprises six (6) magnet poles 5a-h each comprising three (3) permanent magnets 6-n (where n represents the number of magnets in each of said magnet poles 5a-h). The magnet poles 5a-h each extend radially outwardly from the rotational axis Z of the rotor 3 and have a part-cylindrical first outer surface SC1. In the present embodiment the first outer surface SC1 forms a part of a circular cylinder having a first radius R1. The magnet poles 5a-h all have the same general configuration. For the sake of brevity, only a first magnet pole 5a will be described herein. The inter-pole regions 7a-h each comprise first and second external flux barriers 12-1, 12-2; and fifth and sixth external flux barriers 18-1, 18-2. The fifth and sixth external flux barriers 18-1, 18-2 replace the first and second internal flux barriers 11-1, 11-2 of the embodiment described with reference to FIGS. 1 to 5. The first and second external flux barriers 12-1, 12-2; and the fifth and sixth external flux barriers 18-1, 18-2 are arranged symmetrically about the inter-pole axis (q-axis). The first and second external flux barriers 12-1, 12-2 are disposed on opposing sides of the permanent magnets 6-n in the second layer L2; and the fifth and sixth external flux barriers 18-1, 18-2 are disposed on opposing sides of the permanent magnets 6-n in the third layer L3. The first and second external flux barriers 12-1, 12-2 and the fifth and sixth external flux barriers 18-1, 18-2 each comprise an air-filled cavity elongated in a radial direction from the centre of the rotor 3. The first and second external flux barriers 12-1, 12-2 and the fifth and sixth external flux barriers 18-1, 18-2 each comprise an external aperture which is open to the outer circumference of the rotor 3. Thus, the first and second external flux barriers 12-1, 12-2; and the fifth and sixth external flux barriers 18-1, 18-2 form open channels in the outer surface of the rotor 3. The external flux barriers 12-1, 12-2, 18-1, 18-2 are only partially surrounded by the ferromagnetic material of the rotor 3. The first and second external flux barriers 12-1, 12-2 delimit the first magnet pole 5a.

The first and second external flux barriers 12-1, 12-2 form an inter-pole tooth 13a-h in each of the inter-pole regions 7a-h. The fifth and sixth external flux barriers 18-1, 18-2 are formed within the inter-pole regions 7a-h. In this arrangement, the inter-pole tooth 13a-h comprises a plurality of outwardly projecting elongate elements (or fingers) 19-1, 19-2, 19-3, 19-4 separated by the fifth and sixth external flux barriers 18-1, 18-2. The elongate elements 19-1, 19-2, 19-3, 19-4 each extend in a substantially radial direction. Each inter-pole tooth 13a-h comprises a series of part-cylindrical second outer surfaces SC2 having a second radius R2. In the present embodiment, the first radius R1 is different from the second radius R2. In particular, the second radius R2 is greater than the first radius R1. The first radius R1 in the present embodiment is 68.3 mm and the second radius R2 is 68.4 mm. It has been recognised that, in use, the radial dimensions of the magnet poles 5a-h may increase due to the operating loads applied by the permanent magnets 8-n disposed therein. By configuring the rotor 3 such that the first radius R1 is less than the second radius R2, a more uniform gap may be established between the rotor 3 and the stator 4 when the electric machine 1 is operating. In a further variant, the first radius R1 and the second radius R2 may have different centres.

The first magnet pole 5a in the present embodiment comprises third and fourth external flux barriers 14-1, 14-2. The third and fourth external flux barriers 14-1, 14-2 are external apertures which are open to the outer circumference of the rotor 3. The third and fourth external flux barriers 14-1, 14-2 are only partially surrounded by the ferromagnetic material of the rotor 3. The third and fourth external flux barriers 14-1, 14-2 have the same configuration as each other and are arranged symmetrically about the inter-pole axis (q-axis). An enlarged view of the fourth external flux barrier 14-2 is shown in FIG. 12. The fourth external flux barrier 14-2 comprises a sidewall 15 which is inset from the outer circumference of the rotor 3. In the present embodiment, the sidewall 15 comprises first, second and third arcs 16A, 16B, 16C joined to each other to form a continuous curved surface. The third and fourth external flux barriers 14-1, 14-2 extend into the rotor 3 on opposing sides of the first magnet aperture 10-1. As shown in FIG. 12, the depth of the third and fourth external flux barriers 14-1, 14-2 is at least substantially equal to an inner sidewall of the first magnet aperture 10-1. It will be understood that the dimensions of the third and fourth external flux barriers 14-1, 14-2 may be different for rotors 3 having different sizes and/or configurations.

The third and fourth external flux barriers 14-1, 14-2 form opposing peripheral lateral regions 17-1, 17-2 having a third outer surface SC3. The third and fourth external flux barriers 14-1, 14-2 may control flux leakage from the magnet 6-1 disposed in the first layer L1 into the peripheral lateral regions 17-1, 17-2 of the first magnet pole 5*a*. As shown in FIG. 12, the peripheral lateral regions 17-1, 17-2 form a corner portion of the first magnet pole 5*a*. The third outer surfaces SC3 of each of the peripheral lateral regions 17-1, 17-2 may comprise a circular arc. The third outer surface SC3 may have a third radius R3 which is less than the first radius R1 of the first outer surface SC1 formed on a central portion of the magnet pole 5*a*. In the present embodiment, the third radius R3 is at least substantially the same as the second radius R2. In a variant, the third radius R3 may be less than the first radius R1 but greater than the second radius R2 (i.e. R1>R3>R2). Alternatively, or in addition, the elongate elements 19-1, 19-2, 19-3, 19-4 may have outer surfaces with different radii. The elongate elements 19-1, 19-4 coincident with the q-axis of the magnet pole 5*a* may have an outer surface having a radius which is larger than the radius R2 of the second outer surface SC2 of the elongate elements 19-2, 19-3. The radius R2 of the second outer surface SC2 of the elongate elements 19-2, 19-3 may be larger than the third radius R3 of the peripheral lateral regions 17-1, 17-2.

The magnet apertures 10-*n*; the first and second external flux barriers 12-1, 12-2; and the third and fourth external flux barriers 14-1, 14-2; and the fifth and sixth external flux barriers 18-1, 18-2 each comprise an aperture formed in the rotor 3. The apertures are formed by cut-outs in the laminations which are stacked to form the rotor 3. First, second and third lateral bridges S1-S3 are formed on each side of the first magnet pole 5*a*. The first lateral bridges S1 are formed between the magnet apertures 10-1 in the first layer L1 and the third and fourth external flux barriers 14-1, 14-2. As shown in FIG. 12, the third and fourth external flux barriers 14-1, 14-2 formed in the rotor 3 reduce the width of the first lateral bridges S1. The second lateral bridges S2 are formed between the magnet aperture 10-2 in the second layer L2 and the first and second external flux barriers 12-1, 12-2. The third lateral bridges S3 are formed between the magnet aperture 10-3 in the third layer L3 and the first and second internal flux barriers 11-1, 11-2.

Figure 13:
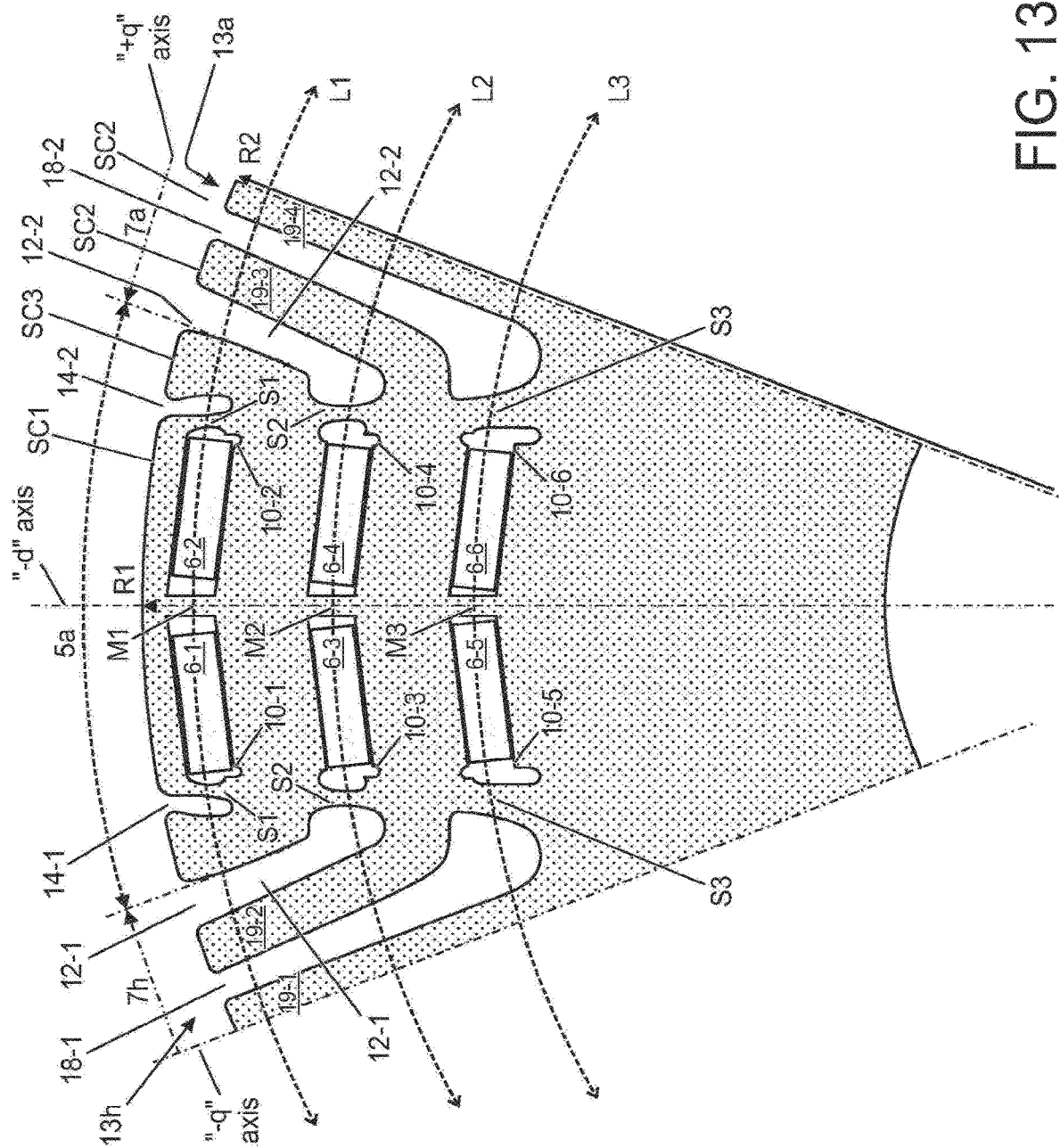
FIG. 13 shows a transverse section through a rotor of an electric machine in accordance with a further embodiment of the present invention.

A variant of the rotor 3 is shown in FIG. 13. Like reference numerals are used for like components. The main changes in this variant relate to orientation of the permanent magnets 6-*n* in each magnet pole 5*a*-*h*. The rotor 3 comprises eight (8) magnet poles 5*a*-*h*, each having the same configuration. The permanent magnets 6-*n* are mounted such that the respective major longitudinal axis of each permanent magnet 6-*n* is disposed at an acute angle to the d-axis of the magnet pole 5*a*-*h*, as shown in the transverse section shown in FIG. 13.

The inter-pole regions 7*a*-*h* each comprise first and second external flux barriers 12-1, 12-2; and fifth and sixth external flux barriers 18-1, 18-2. The first and second external flux barriers 12-1, 12-2 form an inter-pole tooth 13*a*-*h* in each of the inter-pole regions 7*a*-*h*. The fifth and sixth external flux barriers 18-1, 18-2 are formed within the inter-pole regions 7*a*-*h*. In this arrangement, the inter-pole tooth 13*a*-*h* comprises a plurality of outwardly projecting elongate elements (or fingers) 19-1, 19-2, 19-3, 19-4 separated by the fifth and sixth external flux barriers 18-1, 18-2. The elongate elements 19-1, 19-2, 19-3, 19-4 each extend in a substantially radial direction. The first and second external flux barriers 12-1, 12-2; and the fifth and sixth external flux barriers 18-1, 18-2 are arranged symmetrically about the inter-pole axis (q-axis). The first and second external flux barriers 12-1, 12-2 are disposed on opposing sides of the permanent magnets 6-*n* in the second layer L2; and the fifth and sixth external flux barriers 18-1, 18-2 are disposed on opposing sides of the permanent magnets 6-*n* in the third layer L3. The first and second external flux barriers 12-1, 12-2 and the fifth and sixth external flux barriers 18-1, 18-2 each comprise an air-filled cavity elongated in a radial direction from the centre of the rotor 3. The first and second external flux barriers 12-1, 12-2 and the fifth and sixth external flux barriers 18-1, 18-2 each comprise an external aperture which is open to the outer circumference of the rotor 3.

The first magnet pole 5*a* in the present embodiment comprises first and second external flux barriers 12-1, 12-2; third and fourth external flux barriers 14-1, 14-2; and fifth and sixth external flux barriers 18-1, 18-2. The external flux barriers 12-1, 12-2, 14-1, 14-2, 18-1, 18-2 each comprise an external aperture which is open to the outer circumference of the rotor 3. Each external flux barrier 12-1, 12-2, 14-1, 14-2, 18-1, 18-2 is only partially surrounded by the ferromagnetic material of the rotor 3. The first and second external flux barriers 12-1, 12-2 have the same configuration as each other and are arranged symmetrically about the inter-pole axis (q-axis). The third and fourth external flux barriers 14-1, 14-2 have the same configuration as each other and are arranged symmetrically about the inter-pole axis (q-axis). The fifth and sixth external flux barriers 18-1, 18-2 have the same configuration as each other and are arranged symmetrically about the inter-pole axis (q-axis).

The magnet apertures 10-*n*; the first and second external flux barriers 12-1, 12-2; the third and fourth external flux barriers 14-1, 14-2; and the fifth and sixth external flux barriers 18-1, 18-2 each comprise an aperture formed in the rotor 3. The apertures are formed by cut-outs in the laminations which are stacked to form the rotor 3. As shown in FIG. 13, a plurality of bridges (or ligaments) is formed in the rotor 3. First, second and third central bridges M1-M3 are formed between the magnet apertures 10-*n* in the first, second and third layers L1-L3 respectively. First, second and third lateral bridges S1-S3 are formed on each side of the first magnet pole 5*a*. The first lateral bridges S1 are formed between the magnet apertures 10-1, 10-2 in the first layer L1 and the first and second external flux barriers 12-1, 12-2. The second lateral bridges S2 are formed between the magnet apertures 10-3, 10-4 in the second layer L2 and the first and second external flux barriers 12-1, 12-2. The third lateral bridges S3 are formed between the magnet apertures 10-5, 10-6 in the third layer L3 and the first and second internal flux barriers 11-1, 11-2.

In the present variant, the major longitudinal axis of each magnet aperture 10-*m* is inclined at an acute angle relative to the d-axis of the magnet pole 5*a*. Thus, the permanent magnets 6-*n* in each layer L1, L2, L3 have a generally inverted V configuration. First, second and third lateral bridges S1-S3 are formed on each side of the first magnet pole 5*a*. The first lateral bridges S1 are formed between the magnet apertures 10-1 in the first layer L1 and the third and fourth external flux barriers 14-1, 14-2. The third and fourth external flux barriers 14-1, 14-2 formed in the rotor 3 reduce the width of the first lateral bridges S1. The second lateral bridges S2 are formed between the magnet aperture 10-2 in the second layer L2 and the first and second external flux barriers 12-1, 12-2. The third lateral bridges S3 are formed between the magnet aperture 10-3 in the third layer L3 and the first and second internal flux barriers 11-1, 11-2.

Figure 14:
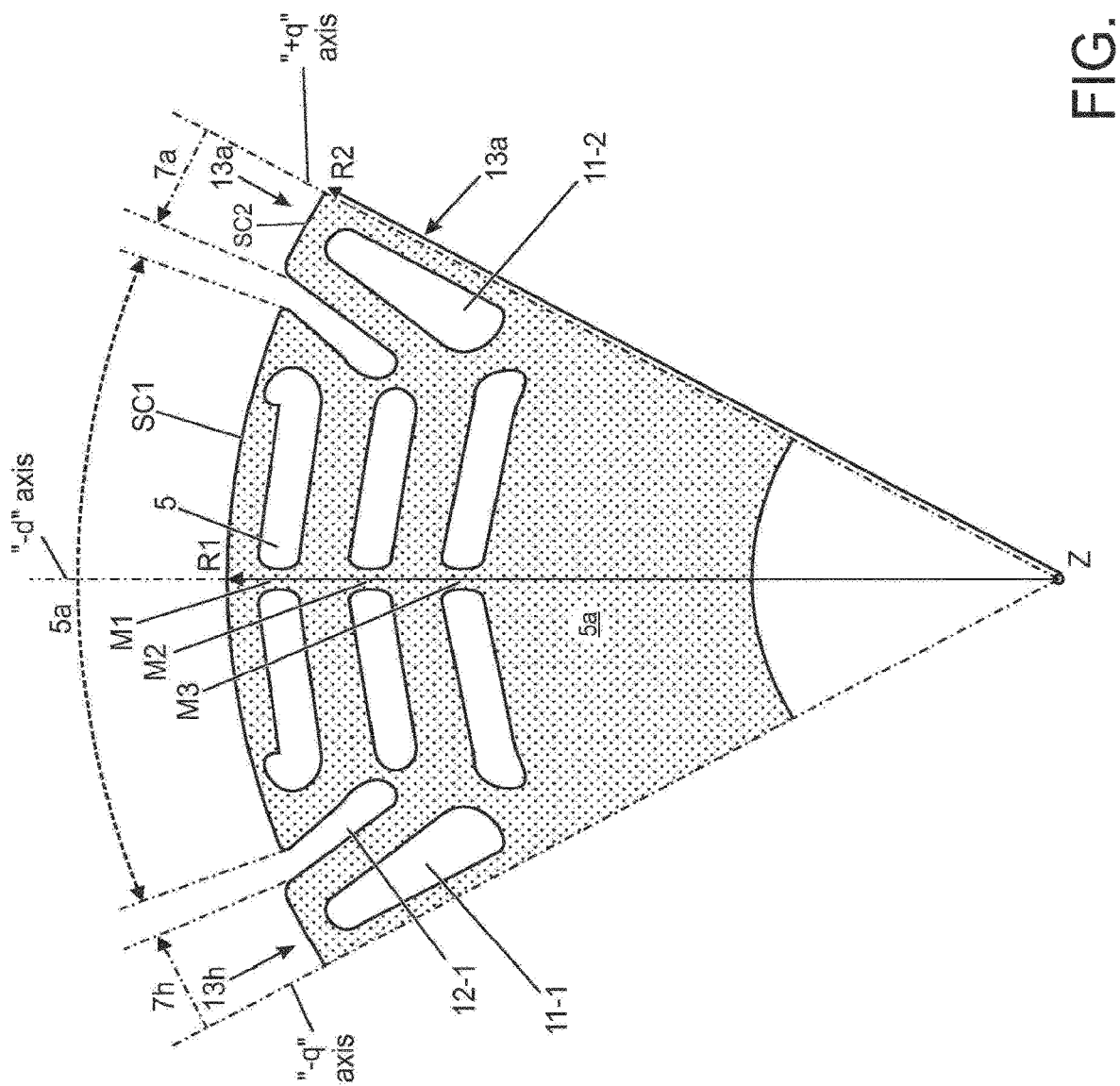
FIG. 14 shows a modified arrangement of the rotor according to an embodiment of the present invention.

A variant of the rotor 3 in accordance with an aspect of the present invention is illustrated in FIG. 14. Like reference numerals are used for like components. The magnet poles 5a-h each have a part-cylindrical first outer surface SC1 having a first radius R1; and each inter-pole tooth 13a-h has a part-cylindrical second outer surface SC2 having a second radius R2. The first outer surface SC1 forms part of a first circular cylinder having a first radius R1; and the second outer surface SC2 forms part of a second circular cylinder having a second radius R2. As shown in FIG. 14, the first outer surface SC1 forms a first circular arc in transverse section; and the second outer surface SC2 forms a second circular arc in transverse section. It will be understood that the first and second outer surfaces SC1, SC2 are arranged concentrically about the rotational axis X of the rotor 3. In the variant illustrated in FIG. 14, the first and second radii R1, R2 are different from each other. In particular, the second radius R2 of the inter-pole tooth 13a-h is greater than the first radius R1 of the magnet poles 5a-h. Thus, the radial extent of the magnet poles 5a-h is less than the radial extent of the inter-pole teeth 13a-h. In use, the radial forces applied to the rotor 3 by the rotation of the magnets 6-n may cause deformation of the magnet poles 5a-h. The radial forces applied to the inter-pole teeth 13a-h are typically lower and resulting deformation is less. Thus, the second radius R2 may be larger than the first radius R1. The air gap between the rotor 3 and the stator 4 is non-uniform when the rotor 3 is stationary. When the rotor 3 is rotating, the difference between said first and second radii R1, R2 is reduced as a result of the larger deformation of the magnet poles 5a-h. At least in certain arrangements, the torque generated by the electric machine 1 may be increased.

It will be appreciated that various modifications may be made to the embodiment(s) described herein without departing from the scope of the appended claims. The present invention has been described with reference to a permanent magnet synchronous machine. The configuration of the permanent magnets 6-n in the rotor 3 may be applied to other types of electric machine.

In the illustrated arrangements the outer surface of the rotor 3 comprises a plurality of circular arcs separated from each other by said external flux barriers 12-n. In a variant, the outer surface of the rotor 3 may comprise or consist of a plurality of non-circular arcs. For example, the first outer surface SC1 of the rotor 3 of each magnet pole 5a-h may be non-circular. The first outer surface SC1 may form a first non-circular arc in transverse section, for example an elliptical arc. The non-circular configuration of the first outer surface SC1 may be useful to accommodate non-uniform deformation of the rotor 3 in use. Alternatively, or in addition, the second outer surface SC2 of the rotor 3 of each inter-pole tooth 13a-h may be non-circular. The second outer surface SC2 may form a second non-circular arc in transverse section, for example an elliptical arc.

The invention claimed is:

1. A rotor for an electric machine, the rotor comprising:
a plurality of magnet poles each comprising a plurality of permanent magnets, the magnet poles being angularly separated from each other and an inter-pole region being formed between adjacent magnet poles;
the permanent magnets being arranged in at least first and second layers in each magnet pole, the first and second layers being radially offset from each other and the first layer being disposed in a radially outer position;
wherein first and second external flux barriers are disposed in each said inter-pole region, the first and second external flux barriers each comprising an external aperture, each permanent magnet being mounted in a respective magnet aperture formed in the rotor, lateral bridges being formed in the rotor between the magnet apertures in the second layer and the first and second external flux barriers;
the rotor further comprising at least one internal flux barrier in each said inter-pole region, each internal flux barrier comprising an internal aperture.

2. The rotor as claimed in claim 1, further comprising a third external flux barrier in each said inter-pole region.

3. The rotor as claimed in claim 2, further comprising a fourth external flux barrier in each said inter-pole region.

4. The rotor as claimed in claim 3, wherein said third and fourth external flux barriers are disposed between said first and second external flux barriers in each said inter-pole region.

5. The rotor as claimed in claim 3, wherein the third and fourth external flux barriers are symmetrical about a central inter-pole axis of each inter-pole region.

6. The rotor as claimed in claim 1, wherein said first and second external flux barriers form an inter-pole tooth.

7. The rotor as claimed in claim 6, wherein each magnet pole has a first outer surface having a first radius and each inter-pole tooth has a second outer surface having a second radius, said first and second radii being different from each other.

8. The rotor as claimed in claim 7, wherein said first radius is less than said second radius.

9. The rotor as claimed in claim 1, further comprising first and second internal flux barriers in each said inter-pole region.

10. The rotor as claimed in claim 9, wherein, within each said inter-pole region, said at least one external flux barrier is disposed between said first and second internal flux barriers.

11. The rotor as claimed in claim 9, wherein, in a first inter-pole region having a first central inter-pole axis, each internal flux barrier is disposed in an inner position proximal to the first central inter-pole axis and each external flux barrier is disposed in an outer position distal from the first central inter-pole axis.

12. The rotor as claimed in claim 1, wherein, within each said inter-pole region, the at least one internal flux barrier is disposed between said first and second external flux barriers.

13. The rotor as claimed in claim 1, wherein the electric machine is a permanent magnet synchronous machine.

14. The rotor as claimed in claim 1, wherein the electric machine is disposed in a vehicle.

15. A rotor for an electric machine, the rotor comprising:
a plurality of magnet poles each comprising a plurality of permanent magnets, the magnet poles being angularly separated from each other and an inter-pole region being formed between adjacent magnet poles;
the permanent magnets being arranged in at least first and second layers in each magnet pole, the first and second layers being radially offset from each other and the first layer being disposed in a radially outer position;
at least one internal flux barrier in each said inter-pole region, each internal flux barrier comprising an internal aperture; and
first and second internal flux barriers in each said inter-pole region;

wherein first and second external flux barriers are disposed in each said inter-pole region the first and second external flux barriers each comprising an external aperture, the first and second external flux barriers being associated with the permanent magnets in the second layer;

wherein, in a first inter-pole region having a first central inter-pole axis, each internal flux barrier is disposed in an inner position proximal to the first central inter-pole axis and each external flux barrier is disposed in an outer position distal from the first central inter-pole axis; and wherein, in a second inter-pole region having a second central inter-pole axis, each internal flux barrier is disposed in an outer position distal from the second central inter-pole axis and each external flux barrier is disposed in an inner position proximal to the second central inter-pole axis.

16. The rotor as claimed in claim 15, wherein said first arid second inter-pole regions are arranged consecutively within the rotor.

17. The rotor as claimed in claim 16, wherein the consecutive arrangement of said first and second inter-pole regions is repeated around the rotor.

18. An electric machine comprising a rotor comprising a plurality of magnet poles each comprising a plurality of permanent magnets, the magnet poles being angularly separated from each other and an inter-pole region being formed between adjacent magnet poles;

the permanent magnets being arranged in at least first and second layers in each magnet pole, the first and second layers being radially offset from each other and the first layer being disposed in a radially outer position;

at least one internal flux barrier in each said inter-pole region, each internal flux barrier comprising an internal aperture; and first and second internal flux barriers in each said inter-pole region;

wherein first and second external flux barriers are disposed in each said inter-pole region the first and second external flux barriers each comprising an external aperture, the first and second external flux barriers being associated with the permanent magnets in the second layer;

wherein, in a first inter-pole region having a first central inter-pole axis, each internal flux barrier is disposed in an inner position proximal to the first central inter-pole axis and each external flux barrier is disposed in an outer position distal from the first central inter-pole axis; and wherein, in a second inter-pole region having a second central inter-pole axis, each internal flux barrier is disposed in an outer position distal from the second central inter-pole axis and each external flux barrier is disposed in an inner position proximal to the second central inter-pole axis.

\* \* \* \* \*